US011667568B1

(12) United States Patent
Kennedy et al.

(10) Patent No.: US 11,667,568 B1
(45) Date of Patent: *Jun. 6, 2023

(54) DRILL CUTTINGS WITH A DRYING AGENT

(71) Applicant: D-Trace Investments, LLC, Allen, TX (US)

(72) Inventors: Donald J. Kennedy, Dallas, TX (US); Jason R. Goodrum, Irving, TX (US)

(73) Assignee: D-Trace Investments, LLC, Allen, TX (US)

( * ) Notice: Subject to any disclaimer, the term of this patent is extended or adjusted under 35 U.S.C. 154(b) by 708 days.

This patent is subject to a terminal disclaimer.

(21) Appl. No.: 16/664,456

(22) Filed: Oct. 25, 2019

Related U.S. Application Data

(63) Continuation of application No. 14/719,150, filed on May 21, 2015, now Pat. No. 10,472,280.
(Continued)

(51) Int. Cl.
C04B 28/04 (2006.01)
C04B 14/00 (2006.01)
(Continued)

(52) U.S. Cl.
CPC ............. *C04B 14/00* (2013.01); *C04B 28/04* (2013.01)

(58) Field of Classification Search
CPC .. C04B 7/00; C04B 7/34; C04B 28/00; C04B 32/00; C04B 9/04; C04B 11/00; C04B 28/14; C04B 14/00; C04B 28/04
(Continued)

(56) References Cited

U.S. PATENT DOCUMENTS 3,168,139 A 2/1965 Kennedy et al.
3,399,608 A 9/1968 Benson
(Continued)

FOREIGN PATENT DOCUMENTS

CN 1280957 1/2001
DE 24 30 371 1/1976
(Continued)

OTHER PUBLICATIONS

AASHTO Guide for Design of Pavement Structures, American Association of State Highway and Transportation Officials, 1993, 40 pgs.
(Continued)

*Primary Examiner* — James E McDonough
(74) *Attorney, Agent, or Firm* — Foley & Lardner LLP

(57) ABSTRACT

Described are stabilized materials and methods and systems for providing said stabilized materials. The system includes a first unit for mixing a first combination that includes a quantity of drill cuttings and a drying agent. The system may include a second unit for mixing the first combination with at least a binder and/or a surface acting agent and providing a second combination. The second combination is formed when the first combination is caused to have a reduced moisture content, transitioning from a first state to a second state. The reduced moisture content in the second state is at least 20% less than the moisture content of the drill cuttings. The first combination in a second state is a stabilized material. The first combination in a second state may be a dried material. The binder and/or a surface acting agent with or without additional additives are not introduced until the first combination is in the second state.

20 Claims, 8 Drawing Sheets

Related U.S. Application Data

(60) Provisional application No. 62/001,258, filed on May 21, 2014.

(51) Int. Cl.
<table>
<tr><td>C04B 7/00</td><td>(2006.01)</td></tr>
<tr><td>C04B 7/34</td><td>(2006.01)</td></tr>
<tr><td>C04B 28/00</td><td>(2006.01)</td></tr>
<tr><td>C04B 32/00</td><td>(2006.01)</td></tr>
<tr><td>C04B 9/04</td><td>(2006.01)</td></tr>
<tr><td>C04B 11/00</td><td>(2006.01)</td></tr>
<tr><td>C04B 28/14</td><td>(2006.01)</td></tr>
</table>

(58) Field of Classification Search
USPC ........ 106/638, 772, 773, 785, 811, 817, 716
See application file for complete search history.

(56) References Cited

U.S. PATENT DOCUMENTS

| | | |
|---|---|---|
| 3,616,204 A | 10/1971 | Linn |
| 3,870,535 A | 3/1975 | Minnick et al. |
| 3,940,281 A | 2/1976 | Corbett |
| 4,028,240 A | 6/1977 | Manchak, Jr. |
| 4,107,112 A | 8/1978 | Latta, Jr. et al. |
| 4,268,318 A | 5/1981 | Stone |
| 4,274,880 A | 6/1981 | Chappell |
| 4,338,134 A | 7/1982 | Graf zu Munster |
| 4,344,485 A | 8/1982 | Butler |
| 4,410,350 A | 10/1983 | Judd |
| 4,460,292 A | 7/1984 | Durham et al. |
| 4,494,975 A | 1/1985 | De Boodt et al. |
| 4,538,793 A | 9/1985 | Dieringer et al. |
| 4,668,121 A | 5/1987 | Bosich |
| 4,668,128 A | 5/1987 | Hartley et al. |
| 4,793,729 A | 12/1988 | Bosich |
| 4,880,468 A | 11/1989 | Bowlin et al. |
| 4,942,929 A | 7/1990 | Malachosky et al. |
| 5,061,318 A | 10/1991 | Casey et al. |
| RE33,747 E | 11/1991 | Hartley et al. |
| 5,096,498 A | 3/1992 | Lowe |
| 5,100,455 A | 3/1992 | Pinckard et al. |
| 5,173,115 A | 12/1992 | Glynn, Jr. et al. |
| 5,213,160 A | 5/1993 | Nahm et al. |
| 5,242,493 A | 9/1993 | Glynn, Jr. et al. |
| 5,264,018 A | 11/1993 | Koenigsberg et al. |
| 5,277,519 A | 1/1994 | Nahm |
| 5,286,427 A | 2/1994 | Koumal |
| 5,336,022 A | 8/1994 | McKennon et al. |
| 5,340,235 A | 8/1994 | Milliken |
| 5,341,882 A | 8/1994 | Hale |
| 5,344,485 A | 9/1994 | Glynn, Jr. |
| 5,363,918 A | 11/1994 | Cowan et al. |
| 5,415,777 A | 5/1995 | Krempen et al. |
| 5,430,237 A | 7/1995 | Sharp |
| 5,476,144 A | 12/1995 | Nahm et al. |
| 5,525,139 A | 6/1996 | Gill |
| 5,609,667 A | 3/1997 | Dickerson |
| 5,766,338 A | 6/1998 | Weber |
| 5,820,302 A | 10/1998 | Roberts et al. |
| 5,874,387 A | 2/1999 | Carpenter et al. |
| 5,927,970 A | 7/1999 | Pate et al. |
| 6,027,558 A | 2/2000 | Little et al. |
| 6,027,634 A | 2/2000 | Shirodkar et al. |
| 6,048,137 A | 4/2000 | Beck, III |
| 6,302,936 B1 | 10/2001 | Adam |
| 6,315,494 B1 | 11/2001 | Oberle |
| 6,322,489 B1 | 11/2001 | Richardson et al. |
| 6,361,596 B1 | 3/2002 | Vidrio et al. |
| 6,402,833 B1 | 6/2002 | O'Hearn et al. |
| 6,413,017 B2 | 7/2002 | Scott et al. |
| 6,706,108 B2 | 3/2004 | Polston |
| 6,752,273 B2 | 6/2004 | Reddoch |
| 7,059,805 B1 | 6/2006 | Addison, Sr. |
| 7,118,624 B2 | 10/2006 | Polston |
| 7,204,310 B1 | 4/2007 | Roddy et al. |
| 7,232,482 B2 | 6/2007 | Polston |
| 7,276,114 B2 | 10/2007 | Polston |
| 7,338,923 B2 | 3/2008 | Roddy et al. |
| 7,371,277 B2 | 5/2008 | Polston |
| 7,413,383 B2 | 8/2008 | Adams |
| 7,674,365 B2 | 3/2010 | Banavali et al. |
| 7,794,133 B1 | 9/2010 | Kern et al. |
| 8,007,581 B2 | 8/2011 | Scott et al. |
| 8,100,198 B2 | 1/2012 | Fout et al. |
| 8,109,456 B2 | 2/2012 | Christensen |
| 8,333,240 B2 | 12/2012 | Roddy et al. |
| 8,945,443 B2 | 2/2015 | Garrick |
| 9,079,188 B2 | 7/2015 | Culver |
| 9,279,289 B2 | 3/2016 | Kerstetter |
| 9,410,386 B2 | 8/2016 | Hemmings et al. |
| 10,472,280 B1 * | 11/2019 | Kennedy ................. C04B 28/14 |
| 2002/0033120 A1 | 3/2002 | Berardi et al. |
| 2003/0116887 A1 * | 6/2003 | Scott ..................... C04B 18/049 |
| | | 264/333 |
| 2004/0123777 A1 | 7/2004 | Polston |
| 2007/0124990 A1 | 6/2007 | Chheda |
| 2008/0087472 A1 | 4/2008 | Fout |
| 2009/0120644 A1 | 5/2009 | Roddy et al. |
| 2010/0127429 A1 | 5/2010 | Scott et al. |
| 2012/0090509 A1 | 4/2012 | Albert |
| 2013/0174759 A1 | 7/2013 | Winkelman |
| 2014/0072368 A1 | 3/2014 | Hemmings et al. |
| 2014/0110870 A1 | 4/2014 | Garrick |

FOREIGN PATENT DOCUMENTS

| | | |
|---|---|---|
| DE | 29 50 462 | 6/1981 |
| DE | 34 06 894 | 9/1985 |
| DE | 39 39 513 | 6/1991 |
| EP | 0 087 492 | 9/1983 |
| EP | 0 291 672 | 11/1988 |
| FR | 2577583 | 8/1986 |
| FR | 2619807 | 3/1989 |
| GB | 1 526 145 | 9/1978 |
| JP | 56020215 | 2/1981 |
| WO | WO-02/102927 | 12/2002 |
| WO | WO-2006/012622 | 2/2006 |
| WO | WO-2007102743 | 9/2007 |
| WO | WO-2008000087 | 1/2008 |

OTHER PUBLICATIONS

AASHTO Guide for Design of Pavement Structures, American Association of State Highway and Transportation Officials, 1993, 624 pgs.

AASHTO Standard Specifications for Transportation Materials and Methods of Sampling and Testing, 24th Edition, Part 2B Tests, 2004, 42 pgs.

AASHTO T 99 and T 180 Moisture-Density Relations of Soils, Revised, Feb. 13, 2015 (8 pages).

Aggregate and Pavement, Subchapter E, Chapter 106—Exemptions from Permitting, Texas Natural Resource Conservation Commission, Feb. 19, 1997, 6 pgs.

Aksoy, et al., The Effect of Natural Resin Addition on Strength Parameters of Railway Embankment, ResearchGate, Oct. 2016, 10 pgs.

Ali, et al., Calibration of Mechanistic-Empirical Rutting Model for In-Service Pavements, Transportation Research Record 1629, Paper No. 98-0260, 1998, pp. 159-168, 10 pgs.

American Concrete Institute, ACI State of the Art Report on Soil Cement, 1997, 28 pgs.

Application for Stationary Land Treatment Facility, Transcon Energy Corporation, Colorado County, Texas, Huffman Hydrocarbon Engineering, L.L.C., Apr. 1998, 86 pgs.

Arnaud, Celia Henry, "Digging into Asphaltenes," Chemical & Engineering News, http://pubs.acs.org/cen/coverstory/87/8738cover.html, vol. 98, No. 38 pp. 12-17, Sep. 21, 2009 (6 pages).

Article on Road-Hardening Solution Turns Gravel Into Solid Surface, Farm Show, (2012) vol. 23 (1 page).

(56) References Cited

OTHER PUBLICATIONS

Barker, et al., Abstract, Land Treatment of Petroleum Hydrocarbon-Based Drill Cuttings: Pilot Scale Field Study, Oct. 4-7, 1992, Washington, D.C., SPE Annual Technical Conference and Exhibition, Society of Petroleum Engineers, accessed at https://www.onepetro.org/conference-paper/SPE-24565-MS?sort=&start=0&q=%22drill+cutting%22+%22construction%22&from_year=1917&peer_reviewed=&published_between=on&fromSearchResults=true&to_year=2002&rows=10 on Feb. 28, 2018, 3 pgs.
BMP Spotlight: Scott Environmental Services Inc., Intermountain Oil and Gas BMP Project, http://www.oilandgasbmps.org/resources/solidwaste_sesi.php, printed Oct. 18, 2011 (2 pages).
Buchanan, Shane, Resilient Modulus: What, Why, and How?, Vulcan Materials Company, Aug. 31, 2007, 13 pgs.
Cheung, Kisuk, Use of Petroleum Contaminated Soil in Cold-Mix Asphalt Stabilized Base Course, Dept. of the Army, Washington, DC 20314-1000, Mar. 1, 1998, 19 pgs.
Chou, Yu T., Design Criteria for Aggregate-Surfaced Roads and Airfields, Department of the Army, Geotechnical Laboratory, Technical Report GL-89-5, US Army Corps of Engineers, Apr. 1989, 113 pgs.
Chow, Liang Chern, Permanent Deformation Behavior of Unbound Granular Materials and Rutting Model Development, University of Illinois at Urbana-Champaign, 2014, 143 pgs.
Conner and Hoeffner, The History of Stabilization Solidification Technology, 1998, 72 pgs.
Design Pamphlet for the Backcalculation of Pavement Layer Moduli in Support of the 1993 AASHTO Guide for the Design of Pavement Structures, Publication No. FHWA-RD-97-076, U.S. Department of Transportation, Federal Highway Administration, Sep. 1997, 32 pgs.
Design Pamphlet for the Determination of Design Subgrade in Support of the 1993 AASHTO Guide for the Design of Pavement Structures, Publication No. FHWA-RD-97-083, U.S. Department of Transportation, Federal Highway Administration, Sep. 1997, 33 pgs.
Design Pamphlet for the Determination of Layered Elastic Moduli for Flexible Pavement Design in Support of the 1993 AASHTO Guide for the Design of Pavement Structures, Publication No. FHWA-RD-97-077, U.S. Department of Transportation, Federal Highway Administration, Sep. 1997, 34 pgs.
Development of Performance-Related Specifications for Portland Cement Concrete Pavement Construction, U.S. Department of Transportation, Federal Highway Administration, Publication No. FHWA-RD-89-211, May 1990, 137 pgs.
Development of Performance-Related Specifications for Portland Cement Concrete Pavement Construction, U.S. Department of Transportation, Federal Highway Administration, Publication No. FHWA-RD-89-211, May 1990, 140 pgs.
Dinchak, William G., Soil-Cement Construction: The Job Operations The Have Put It In Business, The Aberdeen Group, Publication No. C840725 (1984).
Document entitled "Job Plan," dated Dec. 22, 2000 (1 page).
Document entitled "Job Sheet," Job #D1064, contact name Jimmy Booth, dated Dec. 11, 2000 (1 page).
Document entitled "Job Sheet," Job #D1064, Contact Name: Dallas Little, dated Dec. 28, 2000 (1 page).
Document entitled "Job Sheet," Job #D1064, Contact Name: Jim Scrudder, dated Dec. 28, 2000 (1 page).
Document entitled "Job Sheet," Job #D1064, Contact Name: Dallas Little, dated Dec. 27, 2000 (1 page).
Document entitled "Job Sheet," Job #D1064, Contact Name: Jim Scrudder, dated Jan. 3, 2001 (1 page).
Document entitled "Job Sheet," Job #D1064, Contact Name: Jimmy Booth, dated Dec. 22, 2000 (1 page).
Document entitled "Job Sheet," Job #D1064, Contact Name: Jimmy Booth, dated Dec. 27, 2000 (1 page).
Document entitled "Job Sheet," Job #D1064, Contact Name: Jimmy Booth, dated Jan. 3, 2001 (1 page).
Document entitled "Job Sheet," Job #D1064, dated Dec. 14, 2000 (1 page).
Document entitled "Job Sheet," Job #D1064, dated Dec. 16, 2000 (1 page).
Document entitled "Job Sheet," Job #D1064, dated Dec. 18, 2000 (1 page).
Document entitled "Job Sheet," Job #D1064, dated Dec. 22, 2000 (1 page).
Document entitled "Job Sheet," Job #D1064, dated Dec. 7, 2000 (1 page).
Document entitled "Job Sheet," Job #D1064, dated Jan. 18, 2001 (1 page).
Document entitled "Job Sheet," Job #D1064, dated Jan. 4, 2001 (1 page).
Document entitled "Job Sheet," Job #D1064, dated Jan. 6, 2001 (1 page).
Document entitled "Job Sheet," Job #D1064, dated Jan. 8, 2001 (1 page).
Document entitled "Job Sheet," Job #D1064, dated Mar. 16, 2001 (1 page).
Document entitled "Job Sheet," Job #D1064, dated Nov. 27, 2000 (1 page).
Durham, et al., Resilient Modulus Testing for Pavement Components, ASTM International, ASTM Stock No. STP1437, Jan. 2003, 274 pgs.
Engineering and Design, Airfield Flexible Pavement Mobilization Construction, Engineer Manual, Department of the Army Corps of Engineers, EM 1110-3-141, Apr. 1984, 102 pgs.
EPA Method 6010B Inductively coupled plasma-atomic emission spectrometry, revision 2, Dec. 1996.
EPA Method 7471B Mercury in solid or semisolid waste, revision 2, Feb. 2007.
EPA, Silicate Technology Corporation's Solidification/Stabilization Technology for Organic and Irorganic Contaminanants in Soils, Applications Analysis Report, U.S. Environmental Protection Agency, Office of Research and Development, Washington, DC 20460, EPA/540/AR-92/010, Dec. 1992, 149 pgs.
Excerpts from Cole, Assessment and Remediation of Petroleum Contaminated Sites, 1994, 6 pgs.
Excerpts from Huang, Pavement Analysis, 1993, 268 pgs.
Frequently Asked Questions About the Falling Weight Deflectometer (FWD), Technical Advisory, Texas Department of Transportation, Construction and Bridge Divisions, Jun. 2008, 4 pgs.
Hammitt, II, et al., Thickness Requirements for Unsurfaced Roads and Airfields, Bar Base Support, Technical Report S-70-5, Project 3782-65, U.S. Army Engineer Waterways Expreiment Station, Jul. 1970, 139 pgs.
Haywood, Phaedra, "Company returns to Santa Fe to reapply hardening product to Eldorado dirt road," Santa Fe New Mexican. com, Jan. 1, 2012 (2 pages).
Haywood, Phaedra, "Muddy Road Draws Questions About Product," Santa Fe NewMexican.com, Nov. 25, 2011 (2 pages).
Inter Partes Review of U.S. Pat. No. 8,007,581, Case No. IPR2015-00381, Petition for Inter Partes Review, Dec. 5, 2014, 67 pgs.
Inter Partes Review of U.S. Pat. No. 8,007,581, Case No. IPR2018-00203, Petition for Inter Partes Review, Nov. 17, 2017, 67 pgs.
Kabrick, et al., Abstract, Innovative Treatment Alternatives for Oily Wastes Generated During the Exploration and Production of Oil and Gas, Oct. 4-7, 1992, accessed at https://www.onepetro.org/conference-paper/SPE-24564-MS?sort=&start=10&q=%22drill+cutting%22+%22construction%22&from_year=1917&peer_reviewed=&published_between=on&fromSearchResults=true&to_year=2002&rows=10 on Feb. 28, 2018, Washington, D.C., SPE Annual Technical Conference and Exhibition, Society of Petroleum Engineers, 2 pgs.
Kenis, William J., Predictive Design Procedures, VESYS Users Manual, An Interim Design Method for Flexible Pavements Using the VESYS Structural Subsystem, Federal Highway Administration, Jan. 1978, 140 pgs.
Kennedy, et al., Oil Waste Road Application Practices at the Esso-Resources-Canada-Ltd., Cold Lake Production Project, Proceedings of the First International Symposium on Oil and Gas Exploration and Production Waste Management Practices, 1990, 689-701, 13 pgs.

(56) References Cited

OTHER PUBLICATIONS

Kenter, Peter, "Paving the Way," Gas, Oil & Mining Contractor, Aug. 2011 (4 pages).
Kim, et al., Mechanistic-Empirical Rut Prediction Model for In-Service Pavements, Transportation Research Record 1730, Paper No. 00-0165, 2000, p. 99-109, 11 pgs.
Kite, et al. Recycling of Hydrocarbon Impacted Soils, Nov. 7-10, 2000, 33 pgs.
Kostecki, et al., Petroleum Contaminated Soils, vol. 3, University of Massachusetts, Amherst, Lewis Publishers, 1990, 416 pgs.
Lee, et al., Final Report, Subgrade Resilient Modulus for Pavement Design and Evaluation, Joint Highway Research Project, Engineering Experiment Station, Purdue University, Project No. C-36-52N, File No. 6-20-14, Aug. 16, 1993, 360 pgs.
Letter from J. Blake Scott of Scott Environmental Services, Inc., to Bruce McDole of BP Amoco; dated Jan. 17, 2001 (2 pages).
Little, Dallas N., Evaluation of Structural Properties of Lime Stabilized Soils and Aggregates, vol. 1: Summary of Findings, Prepared for the National Lime Association, Jan. 5, 1999, 97 pgs.
Little, Dallas N., Handbook for Stabilization of Pavement Subgrades and Base Courses with Lime, Lime Association of Texas, 1995, 245 pgs.
Little, et al., Characterization of Design Properties (Compressive Strength and Resilient Modulus) of Lime, Cement, Fly Ash Stabilized Structural Recycled Concrete Base as a Function of Curing Time, Presented for the 2002 Federal Aviation Administration Airport Technology Transfer Conference, 2002, 17 pgs.
Little, et al., Identification of the Structural Benefits of Base and Subgrade Stabilization, Texas Transportation Institute, Texas A&M University System, Research Report 1287-2, Study No. 0-1287, Nov. 1994, 441 pgs.
Little, et al., Resilient Modulus of Asphalt Concrete, Texas Transportation Institute, The Texas A&M University System, Study No. 2/3-10-8-89/0-1177, Report No. FHWA/TX-93-1177-1F, Nov. 1991, 168 pgs.
Makhaly Ba, et al., Prediction of permanent deformation model parameters of unbound base course aggregates under repeated loading, Road Materials and Pavement Design, 16:4, 854-869, DOI: 10.1080/14680629.2015.1063534, 2015, 17 pgs.
Mansoori, et al., "Nanoscale Structures of Asphaltene Molecule, Asphaltene Steric-Colloid and Asphaltene Micellles & Vesicles," Chemical Engineering Science, vol. 56, pp. 6933-6939 (2001) http://tigger.uic.edu/~mansoori/Asphaltene.Molecule_html (5 pages).
Meador, Chris, TNRCC Analytical Report. Nov. 29, 1999, pp. 1-38, Corpus Christi, Texas 78408, 41 pages total.
Meegoda, et al., Compaction Characteristics of Contaminated Soils-Reuse as a Road Base Material, Recycled Materials in Geotechnical Applications, ASCE Geotechnical Special Publication # 79, ISBN: 0-7844-0387-2, 1998, 17 pgs.
Meegoda, et al., Use of Remediated Petroleum Contaminated Soils in Highway Construction, Geotechnical Special Publication No. 59, Engineering Contaminated Soils and Extraction of Soil Geomembranes, 1996, 1-17, 10 pgs.
Meegoda, Stabilization/Solidification of Petroleum-Contaminated Soils with Asphalt Emulsions, Practice Periodical of Hazardous, Toxic, and Radioactive Waste Management, Jan. 1999, 46-55, 10 pgs.
Mooney, et al., Accelerated Curing and Strength-Modulus Correlation for Lime-Stabilized Soils, Report No. CDOT-2010-1, Final Report, Colorado Department of Transportation, DTD Applied Research and Innovation Branch, Jan. 2020, 56 pgs.
Mulabdic, Reuse of Polluted Soil in Oil Fields for Construction of Secondary Roads, Engineering Geology and the Environment, 1997, 2023-2026, 7 pgs.
Nahm, et al., Abstract, New Facets of Universal Fluid Usage: Reduction of Hole Wash-Out and Solidification for Environmentally Safe Drilling Waste Disposal, Mar. 3-6, 1998, Dallas, Texas, accessed at https://www.onepetro.org/conference-paper/SPE-39384-MS on Feb. 28, 2018, 2 pgs.
Nahm, et al., New Facets of Universal Fluid Usage: Reduction of Hole Wash-Out and Solidification for Environmentally Safe Drilling Waste Disposal, IADC/SPE Drilling Conference, 1998, 13 pgs.
NMT Asphaltene FAQ, Publication from Petrophysics & Surface Chemistry, J.S. Buckley, editor, accessed Dec. 2011 http://baervan.nmt.edu/Petrophysics/current.html (13 pages).
Notification Concerning Transmittal of The International Preliminary Report on Patentability including International Preliminary Report on Patentability, and Written Opinion of the International Searching Authority, for International Appl. No. PCT/US2013/021044 dated Jul. 24, 2014 (10 pages).
Notification Concerning Transmittal of International Search Report and Written Opinion for International Appl. No. PCT/US2013/021044 dated Apr. 30, 2013 (13 pages).
Pamukcu, et al., Study of Possible Reuse of Stabilized Petroleum Contaminated Soils as Construction Material, In: Petroleum Contaminated Soils, Kostecki, P.T. and Calabrese, E.J. (eds.), vol. 3, Lewis Publishers, 1989, pp. 203-214, 12 pgs.
Pavement Design for Roads, Streets, Walks, and Open Storage Areas, Departments of the Army and the Air Force, Jun. 1992, 118 pgs.
Performance Site Management Memorandum from Ace Wise to Blake Scott, dated Jan. 3, 2001, Re: SESI Job Eastern OK w/OBC (1 page).
Portland Cement Concrete Materials Manual, Publication No. FHWA-ED-89-006, U.S. Department of Transportation, Federal Highway Administration, Aug. 1990, 220 pgs.
Portland Cement Concrete Materials Participant Notebook, Publication No. FHWA-HI-95-024, U.S. Department of Transportation, Federal Highway Administration, Mar. 1995, 162 pgs.
Portland Cement Concrete Testing Manual, Publication No. FHWA-PD-91-013, U.S. Department of Transportation, Federal Highway Administration, 1991, 32 pgs.
Powell, et al., The Structural Design of Bituminous Roads, Transport and Road Research Laboratory, Department of Transport, TRRL Laboratory Report 1132, 1984, 69 pgs.
Quote Sheet, Quote #S1010, dated Nov. 27, 2000 (1 page).
Railroad Commission of Texas Application for Mobile Commercial Recycling Permit to Treat Oil and Gas Waste for Use as a Roadbase, under the project name Pronghorn Mobile PugMill, May 2011 (32 pages).
Schoenberger, et al., Use of Diesel-Contaminated Soil in Recycled Cold-Mix Pavement, ASCE, Practice Periodical of Hazardous, Toxic and Radioactive Waste Management, Jul. 1999, pp. 118-123, 6 pgs.
Schrivner, et al., Calculation of the Elastic Moduli of a Two Layer Pavement System from Measured Surface Deflections, Research Report No. 123-6, Highway Design Division Research Section, Texas Highway Department, Mar. 1971, 112 pgs.
Schumacher, et al., Abstract, Minimization and Recycling of Drilling Waste on the Alaskan North Slope, Jun. 1991, Journal of Petroleum Technology, vol. 43, Issue 6, Society of Petroleum Engineers, accessed at https://www.onepetro.org/journal-paper/SPE-20428-PA on Feb. 28, 2018, 3 pgs.
*Scott Environmental Services, Inc.* v. *A to Z Mud Co., Inc.*, Civil Action No. 2:13-cv-00701; USDC, Eastern District of Texas (Marshall), Complaint filed Sep. 10, 2013.
*Scott Environmental Services, Inc.* v. *Waste Facilities, Inc.*, Civil Action No. 2:16-cv-01279; USDC, Eastern District of Texas (Marshall), Complaint for Patent Infringement filed Nov. 18, 2016.
Smith, et al., Research on the Re-use of Drill Cuttings Onshore, Cordah Research Limited, Nov. 11, 1999, 62 pgs.
Soil Analytical Services, Inc. Report by Marianne R. Guzman, Assistant Lab Manager, dated Dec. 21, 2000 (1 page).
Soil Analytical Services, Inc., Document entitled "Chain of Custody," Relinquished by Blake Scott, dated Dec. 1, 2000 (1 page).
Sorheim, et al, Abstract, Oily Drill Cuttings—From Waste to Resource, Society of Petroleum Engineers, SPE International Conference on Health, Safety and Environment in Oil and Gas Exploration and Production, Jun. 26-28, 2000, Stavanger, Norway, accessed at https://www.onepetro.org/conference-paper/SPE-61273-MS on Feb. 27, 2018, 3 pg.

(56) References Cited

OTHER PUBLICATIONS

Standard Terminology Relating to Concrete and Concrete Aggregates, Designation: C 125-03, ASTM International, Jul. 2003, 4 pgs.
Standard Terminology Relating to Pavement Distress, Designation: E1778-98a, ASTM International, Aug. 2015, 3 pgs.
Standard Test Method for Automated Heithaus Titrimetry, ASTM Designation D 6703-01, published Oct. 2001 (9 pages).
Standard Test Methods for Laboratory Compaction Characteristics of Soil Using Standard Effort (2 400 ft-lbt/ft (600 kN-m/m)), Designation: D 698-07, ASTM International, Jul. 2007, 13 pgs.
Standard Test Methods for Laboratory Compaction Characteristics of Soil Using Standard Effort, ASTM International, University of New Hampshire, Aug. 14, 2017, 14 pgs.
Standard Test Methods for Liquid Limit, Plastic Limit, and Plasticity Index of Soils, Designation: D 4318-00, ASTM International, Sep. 2000, 14 pgs.
Standard Test Methods for Unconfined Compressive Strength of Compacted Soil-Lime Mixtures, Designation: D5102-09, ASTM International, Nov. 2009, 7 pgs.
Standard Test Methods for Unconfined Compressive Strength of Compacted Soil-Lime Mixtures, Designation: D5102-96, ASTM International, Jun. 1996, 6 pgs.
State of Texas Railroad Commission Commercial Permit (part 1), Boundary Venture, Apr. 1998-2001, 117 pgs.
State of Texas Railroad Commission Commercial Permit (part 2), Boundary Venture, Jun. 22, 1998, 53 pgs.
Statewide Special Specification 3157 (1993), Cold Processed-Recycled Paving Material (RPM) for Use as Aggregate Base Course, Texas Department of Transportation, Jul. 23, 1999, 7 pgs.
Suprenant, et al., Oilcrete, Civil Engineering, Apr. 1990, 4 pgs.
Test Method Tex-126-E, Molding, Testing, and Evaluation of Bituminous Black Base Materials, Manual of Testing Procedures, vol. I, Texas Department of Transportation, Materials and Tests Division, Sep. 1995, 16 pgs.
Testa, et al., The Use of Environmentally Processed Asphalt as a Contaminated Soils Rediation Method, Applied Environmental Services, Inc., Lewis Publishers, 1993, 212 pgs.
Texas Natural Resource Conservation Commission, Total Petroleum Hydrocarbons TNRCC Method 1005 (TCEQ Method 1005), revisions 03, Jun. 1, 2001.
Texas Natural Resources Conservation Commission Inspection Report, Sep. 11, 1999, 7 pages.
The Asphalt Institute, Asphalt Cold Mix Manual, Asphalt Institute MS-14, 1989, 197 pgs.
Thompson, M.R., Mechanistic Design Concepts for Stabilized Base Pavements, Civil Engineering Studies, Transportation Engineering Series No. 46, Illinois Cooperative Highway and Transportation Series No. 214, UILU-ENG-86-2008, ISSN: 0197-9191, Jul. 1986, 52 pgs.
Thompson, Marshall R., Split-Tensile Strength of Lime-Stabilized Soils, University of Illinois, Sponsored by Committee on Lime and Lime-Fly Ash Stabilization and presented at the 44th Annual Meeting, 1965, 69-82, 14 pgs.
Thompson, Shear Strength and Elastic Properties of Lime-Soil Mixtures, 1965, 14 pgs.
Toohey, et al., Relationship Between Resilient Modulus and Unconfined Compressive Strength for Lime-Stabilized Soils, American Society of Civil Engineers, J. Geotech. Geoenviron. Eng. 2013.139; 1982-1985., 2013, 4 pgs.
Tseng, et al., Prediction of Permanent Deformation in Flexible Pavement Materials, ASTM Int'l, 1989, 154-172, 19 pgs.
Tuncan, et al., Reuse of Stabilized Petroleum Drilling Wastes as Sub-Bases, Environmental Geotechnics, Kamon (ed.), 1996, 6 pgs.
Tuncan, et al., Stabilization of Petroleum Contaminated Drilling Wastes by Additives, The International Society of Offshore and Polar Engineers, 1997, 4 pgs.
Tuncan, et al., Use of Petroleum-Contaminated Drilling Wastes as Sub-Base Material for Road Construction, Waste Manage Res 2000: 18: 489-505, 2000, 17 pgs.
Turner, J.P., Soil Stabilization Using Oil Shale Solid Wastes: Laboratory Evaluation of Engineering Properties, Topical Report, U.S. Dept. of Energy, by University of Wyoming, Jan. 1991, 23 pgs.
TxDOT, Use of Petroleum Hydrocarbon Affected Material in Asphalt Stabilized Base, Mitchell County, 1999, 11 pgs.
U.S. Appl. No. 60/311,439, filed Aug. 10, 2001, Inventors Jonathan B. Scott, Billy R. Scott, and Dallas N. Little, entitled Incorporation of Drilling Cuttings Into Stable Load-Bearing Structures.
Veil, John A., Offsite Oil Field Waste Disposal Varies Across U.S., Argonne National Laboratory, Nov. 17, 1997, 5 pgs.
Verstraeten, et al., The Belgian Road Research Center's Overall Approach to Asphalt Pavement Structural Design, Proc., 4th International Conference on. Structural Design of Asphalt Pavements, University of Michigan,. Ann Arbor, 1977, 298-324, 27 pgs.
Yoder, et al., Principles of Pavement Design, Second Edition, John Wiley & Sons, Inc., 1975, 55 pgs.
Zhou, et al., VESYS5 Rutting Model Calibrations With Local Accelerated Pavement Test Data and Associated Implementation, Texas Transportation Institute, The Texas A&M University System, Sep. 2002, 77 pgs.

\* cited by examiner

DRILL CUTTINGS WITH A DRYING AGENT

CROSS REFERENCE TO RELATED APPLICATIONS

Pursuant to 35 U.S.C. § 119(e), this application is a continuation of U.S. patent application Ser. No. 14/719,150, entitled "Drill Cuttings With a Drying Agent," filed May 21, 2015, and naming Donald J. Kennedy and Jason R. Goodrum as inventors, which is a non-provisional of U.S. Provisional Application No. 62/001,258 entitled "Remediated Drill Cuttings With a Drying Agent," filed May 21, 2014, and naming Donald J. Kennedy and Jason R. Goodrum as inventors, the disclosures of which are incorporated herein by reference in their entirety.

BACKGROUND

The invention described includes materials stabilized and/or recycled and methods of making said materials.

Drill cuttings removed during drilling pose a potential biohazard because of pollutants or contaminants contained in the drill cuttings. Drill cuttings include about 50% fines with the remainder containing coarse aggregate, moisture and any additive (e.g., drilling mud) used in the process of drilling. One such additive is a fuel source containing hydrocarbons, such as diesel. The fuel source amount will vary and may, in some instances, account for about 5-15% or up to or more than 30% of the total, of what may be referred to as drill cuttings. Because of the fuel source as well as other potential contaminants in the drill cuttings, drill cuttings require stabilization, e.g., remediation and/or recycling, to be re-used, which will necessitate improvements to existing methods of containing the contaminants found in drill cuttings in order for said material to be considered stabilized, remediated and/or deemed as recycled and suitable for re-use.

OVERVIEW

Described herein are methods of preparing stabilized and/or recycled materials and the stabilized or recycled materials obtained from said methods. Said stabilized and/or recycled materials are suitable for re-use. Said stabilized or recycled material suitable for re-use are so obtained that contaminants are also contained in the materials so that said materials when stabilized are suitable for re-use and/or may be deemed suitable for recycling. Said stabilized and/or recycled materials suitable for re-use are so obtained that contaminants are not released from the materials when stabilized or with re-use.

In one or more embodiments, a method described herein includes preparing a first combination of components. Components for the first combination include drill cuttings and a drying agent. The first combination is prepared by comingling or blending the drying agent(s) with the drill cuttings. The drill cuttings may include water-based or non-water based and/or synthetic additives. Generally, the drying agent has an alkaline pH, a high amount of calcium carbonate and a low pozzolanic activity or is a poor pozzolan. Preferably, the drying agent is not contaminated, such as with organic materials or carbon or containing carbon. The drying agent is, in one or more embodiments, one or more of a kiln by-product, such as a cement kiln dust, a lime kiln dust, class F fly ash, blast furnace slag, bottom ash, class C fly ash, or similar ash, or natural hydraulic lime, or caliche, having an alkaline pH. The drying agent is in an amount between about 1 and about 20% of the quantity of drill cuttings. The drying agent in the first combination may also be in an amount between about 1 and about 15% of the quantity of drill cuttings. The drying agent in the first combination may also be in an amount between about 5 and 10% of the quantity of drill cuttings, or greater than about 5% or less than about 10%. No additional water or other ingredients are required in the first combination. In some embodiments, water is not added to provide the first combination. The first combination is allowed to rest to reduce its moisture content. Resting may include air drying with or without heat. Resting may be with added heat or cooling. Resting may take place for a few days, for about a week or more, especially in the absence of added heat or cooling. The resting occurs after comingling the components that make up the first combination. Resting may include discharging the first combination after blending. The resting may include allowing the first combination to rest on a surface and then drying with or without heat or cooling. The resting may include initially stacking or laying out the first combination on a surface and then air drying with or without heat or cooling. The first combination may be stacked, or may be laid out as a bed. Upon resting, the moisture content in the first combination may be reduced by about 10%, or by about 15%, or by about 20%, or by about 25%, or by about 30%, or by about 40%, or by about 50%, or by more than 50%, or by about 60%, or more than 60%. By reducing the moisture content, the first combination has been dried from a first state to a second state, the first state having more moisture than the second state. In some embodiments, the second state may be a friable state. The second state means that the mixture is less cohesive. In some embodiments, the second state may be considered to be particulated, said particulates prevented from forming a much larger cohesive mass or aggregated mass, thus when forced together, said particulates generally fall apart. Only after reaching said second state are additional components added, when desired. In some embodiments, the stabilized material may be used and/or usable upon achieving the second state. In some embodiment, the stabilized material may be used and/or is usable after including additional components to materials that have achieved the second state. Said additional components may include at least a binder, which, when combined with the first combination in the second state, forms a second combination. The second combination may be ready for use or may include further molding and/or manipulation. The second combination is in one or more embodiments, a stabilized material; it may be considered a remediated material and/or deemed a recycled material for reuse. The second combination may be useful after addition of water, when re-hydrated. The second combination does not generally form a larger cohesive or solidified mass without addition of water. In one or more methods, the first combination is prepared first, followed by preparing of the second combination, the second combination is then hydrated, and when re-hydrated is capable of being further shaped into a desired shape. After hydration, the second combination will solidify and have a solidified matrix. The second combination may take the shape of a bed or a pallet at a desired thickness. The second combination may be introduced into a mold or a cavity or a space and take on the shape of said mold or cavity or space (in whole or in part). The second combination may form one or more layers or become a part of a plurality of layers.

In some embodiments, either or both the first and second combinations are prepared near the location from where the drill cuttings were obtained. In some embodiments, either or both the first and second combinations (before or after hydration) are transported to a desired location by pipe or other means, such as a truck or container or the like. In some embodiments, either or both of the first and second combinations are stored before use.

In one or more embodiments, the first combination is prepared by introducing the components of the first combination, in parallel or in series, with a first mixing unit and blending or comingling said components using the first mixing unit. Similarly, the second combination is prepared by having the first combination (when in a suitable or desired reduced moisture, the suitable or desired second state) and at least one binder and introducing a second mixing unit and allowing the second mixing unit to operate, thereby forming the second combination. Both the first mixing unit and the second mixing unit may be the same type of unit or may be the exact same unit, or may be different units for blending. Suitable examples of mixing units include a pug mill as well as other units for blending, such as ones containing an auger screw; said units known to those of skill in the art for blending, including the blending of aggregates or road base materials. A first and/or second mixing unit may also include a skid steer comprising, for example, a bucket and/or mixer. Either or both the first mixing unit and the second mixing unit may also be one that encloses at least some of the components and/or is capable of heating or cooling, introducing a temperature to one or more of the components. Either or both of the first and second mixing units may also have an output container for collecting and/or holding, the output container may also be from which moisture may be removed and/or collected. Either or both of the first and second mixing units will have an output member or region from which the blended material is discharged after comingling or blending.

In one or more embodiments, the first combination is prepared by providing the components of the first combination (i.e., drill cuttings and a drying agent), in parallel or in series, on a surface or in a container having at least one supporting surface. The supporting surface may, in some embodiments, be or include soil (sediment, moraine, sand, clay, gravel, etc.) or rock (shale, clay, chalk, limestone, sandstone, igneous rock, etc.) or a binder (cementitious, asphalt, etc., solidified, partially solidified, or not yet solidified) and various combinations thereof. Upon providing said components on the surface, the components are blended or comingled by introducing a first mixing unit as a first mixer, in a first mixing. Similarly, the second combination is prepared by providing at least one binder, such as a hydraulic binder, to surface of or comingled with the first combination (when in a suitable or desired reduced moisture, a suitable or desired second state). Upon providing said binder, such as an hydraulic binder, on said surface of the first combination, blending or comingling by introducing a second mixing unit as a second mixer, in a second mixing, thereby forming the second combination. Both the first mixer and the second mixer may be the same type or may be the exact same, or may be different. Suitable examples of mixers include those described herein, including ones containing blades, one or more buckets, an auger screw, one associated with a skid steer or any other that may be used for blending aggregates for road base materials, as examples. Either or both the first mixer and the second mixer may also be capable of heating or cooling or introducing a change in temperature when comingling or blending. Either or both of the first and second mixers may also have an output container or region for providing the second combination, and/or for collecting and/or for holding and/or from which moisture may be removed and/or collected therefrom. Either or both of the first and second mixers will have an output member or region from which the blended material may be discharged after blending. Various options for said mixers include but are not limited to belt feeders, buckets, screw feeders, silos, belt scales, proportioning systems, water systems, movers, conveyors, control houses, and generators.

Said methods do not require pre-treatment of the drill cuttings. Said methods do not require but may include a separation step of the drill cuttings, in which components of the drill cuttings are physically separated or run through one or more screens. Said methods do not require a scrubbing system or scrubbing step. Said methods also do not require drilling any of the components of the first combination or second combination into a bore hole after retrieving the drill cuttings. Instead, said methods (and the materials that are produced therefrom) can be performed at any time on drill cuttings retrieved from a drill site. Said methods (as well as the materials produced therefrom) may be performed at the same location or very near a drill site location or may be removed from the drill site location, the methods performed at any time after retrieval of the drill cuttings.

The methods described provide stabilized materials that are stabilized and/or recycled materials. Said materials are dried materials that may be solidified. In one or more embodiments, the stabilized material will include a quantity of drill cuttings requiring stabilization and/or recycling and a drying agent. The drying agent is generally in an amount between about 1 and about 20% of the quantity of drill cuttings. In the stabilized material, the drying agent may also be in an amount between about 5 and about 10% of the quantity of drill cuttings. With the combination of drying agent and the quantity of drill cuttings, the stabilized material will have a reduced moisture content (second state) which is less than the original moisture content in the quantity of drill cuttings prior to addition of the drying agent and is less than the combination of drying agent and drill cuttings when first introduced (first state). In some embodiments, the moisture content of the remediated material is significantly less than its original moisture content (prior to addition of the drying agent). In some embodiments, the drying agent is one having an alkaline pH, a high amount of calcium carbonate and a low pozzolanic activity (is a poor pozzolan). In some embodiments, the drying agent is kiln dust or ash or similar by-product (calcined or thermally decomposed) having an alkaline pH greater than about 9 or about 10 or more.

The methods described also provide a stabilized material that includes a quantity of drill cuttings, e.g., requiring remediation, comingled with a drying agent, and at least a binder, such as hydraulic binder. The binder is incorporated only after the quantity of drill cuttings has achieved a second state in the absence of water or without the addition of water, and having first been combined with the drying agent and transformed from a first state to a second state, said second state having a reduced moisture content, less than the moisture content of the original drill cuttings (i.e., prior to addition of the drying agent) or less than the moisture content of the first state. The second state is a less-cohesive state, and, in some embodiments, includes a state that prevents a larger mass from forming. In some embodiments, the second state is provided as a particulated state, in which said particulates are prevented from forming a much larger aggregated or a cohesive mass. In some embodiments, the second state has less than the optimum moisture content for compaction (e.g., as specified by the American Association of State Highway and Transportation, T-99). The binder is, as an example, an alkaline hydraulic and/or cementitious binder having pozzolanic activity. The hydraulic binder as a good pozzolan, when added to the combination of the drill cuttings and drying agent in the second state, will undergo a hydraulic reaction when hydrated, and will thereafter solidify. The hydraulic binder may be blended prior to or after hydration. Hydration may occur at once or in doses. Hydration is required for solidification of the second combination; however, solidification generally requires a hydraulic binder comingled with the second combination since the drying agent is not considered a pozzolan or a good pozzolan.

Further described is a system for providing a stabilized material, the system comprising a first mixing unit for providing a first combination that includes a quantity of drill cuttings requiring stabilization. The system also includes a drying agent, as previously described, for blending with the quantity of drill cuttings. In addition, the system includes a second mixing unit for blending output of the first mixing unit with a hydraulic binder. Suitable examples of mixing units as mixers include but are not limited to standard mixer, a pug mill, as well as other means for blending, such as mixing means containing one or more blades, or an auger screw; said units or mixing means known to those of skill in the art for blending, including the blending of aggregates, hydrated binders, and/or road base materials.

Still further is a method of preparing a stabilized material. The method includes combining a drying agent and a quantity of drill cuttings to form a first combination, the quantity of drill cuttings having a moisture content between about 1% and about 45%, the drying agent in the first combination being in an amount between about 1% and about 20% based on a weight of the drill cuttings, the drying agent causing the first combination to achieve a first state having a moisture content less than the moisture content of the drill cuttings. The method includes causing the first combination to achieve a second state, the second state including a reduced moisture content as compared with the moisture content of the first state, the reduced moisture content being at least 20% less than the moisture content of the drill cuttings. The method includes combining the first combination in the second state with at least one surface acting agent, thereby forming a second combination, the second combination forming the stabilized material. The drying agent may be at least one of a kiln dust, and ashable by-product of an alkaline material. The drying agent may be alkaline and a by product of a calcination reaction. The drying agent may be in an amount between about 5% and about 12% based on the total weight of the first combination. The method may further comprise hydrating the second combination. The method may further comprise combining utilizes a mixer. The method may include combining the second combination with at least one hydraulic binder and water. In the method, causing includes the first combination achieving a second state includes stacking and air drying for at least seven days. The method may further comprise removing at least a portion of drilling mud from the drill cuttings before combining with the drying agent. The moisture content of the drill cuttings may be between about 5 and about 15%.

In additional embodiments a stabilized material is described herein. The stabilized material comprises a quantity of drill cuttings requiring stabilization. The quantity of drill cuttings may have moisture content between about 1 and about 45%. The stabilized material comprises a drying agent. The drying agent may be in an amount between about 1 and about 20% based on a weight of the drill cuttings. The stabilized material comprises at least one surface acting agent. The at least one surface acting agent may be incorporated only upon combining the quantity of drill cuttings and the drying agent and achieving a transition in moisture content from a first moisture state to a second moisture state, the second moisture state less than the first moisture state, a second moisture state having a moisture content that is at least about 20% less than the moisture content of the drill cuttings. The drying agent may be in an amount between about 5 and about 10% of the quantity of drill cuttings. The drying agent may be a kiln dust. The drying agent may be alkaline and a by product of a calcination reaction. The stabilized material may further comprise a hydraulic binder and water. The stabilized material may further comprise water, the water being introduced only after achieving the transformation. The drying agent is a poor pozzolan.

In still further embodiments is described a system for providing a stabilized material. The system comprises drill cuttings having a moisture content of between about 1 and about 45%. The system comprises a first mixing unit for providing an output as a first combination when introducing a quantity of drill cuttings with the first mixing unit. The system comprises a drying agent for combining with the drill cuttings, the drill cuttings having an amount of about 20% based on the weight of the drill cuttings. The system comprises a second mixing unit for introducing the first combination with at least one surface acting agent. The first mixing unit and second mixing unit may be the same. The first mixing unit and the second mixing unit may be different. The first mixing unit may be a skid steer comprising a mixer and the second mixing unit may be an auger screw. The system may further comprise a container for storing the first combination. The system may further comprise a receiving unit for receiving output from the second mixing unit. The receiving unit may be selected from the group consisting of piping, tubing, pallet, sheet, pit and combinations thereof. The drying agent may be a kiln dust.

These and other embodiments and features and the advantages thereof, will become readily apparent from the following description, taken in conjunction with any exemplary representations, drawings and/or examples.

BRIEF DESCRIPTION OF THE DRAWINGS

For a more complete understanding of the description provided herein and the advantages thereof, reference is now made to the brief description below, taken in connection with the accompanying drawing and detailed description.

DETAILED DESCRIPTION

Figure 1A:
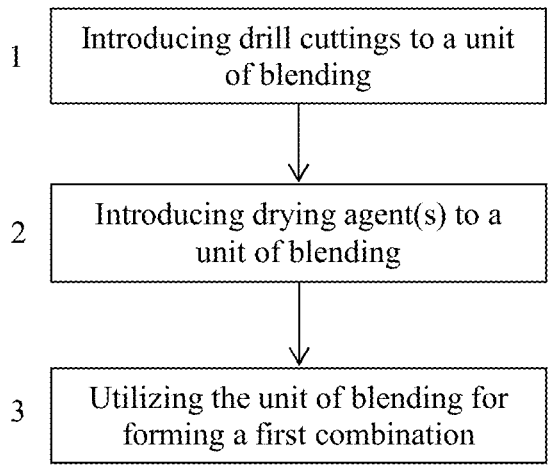
FIGS. 1A-1C depict representatively methods for providing a first combination as described herein.

Although making and using various embodiments are discussed in detail below, it should be appreciated that as described herein are provided many inventive concepts that may be embodied in a wide variety of contexts. Embodiments discussed herein are merely representative and do not limit the scope of the invention.

Described herein are systems and methods of making stabilized and/or recycled materials and the materials themselves. The stabilized and/or recycled materials are suitable for re-use, such as a sub base, meeting performance criteria and/or standards for a sub base or as a sandy, non-plastic road material. The stabilized and/or recycled materials are suitable for re-use, such as a sub grade road material, meeting performance criteria and/or standards for a sub grade road material. The stabilized and/or recycled materials provided herein may be on-site recycled materials that are stabilized in accordance with State and Federal road and highway requirements and suitable for use as a road material. The stabilized and/or recycled materials may be deemed as non-hazardous recycled materials for re-use. The stabilized and/or recycled materials will include drill cuttings that require stabilization, due to the fact that the drill cuttings contained an amount of contaminant or pollutant requiring stabilization.

The drill cuttings requiring stabilization may include drill cuttings that have or have not been separated from the drilling mud or drilling fluids; the drilling mud may be synthetic, aqueous based or non-aqueous based. With or without separation of drill cuttings from drilling mud, drill cuttings will have fines and course aggregate saturated with moisture, the moisture derived at least in part from the drilling mud. Such drill cuttings may also be referred to as aggregated drill cuttings. It is not uncommon for said drill cuttings to contain, even after separation, about 5 to about 10% moisture, or about 5 to about 15% moisture, or about 5 to about 40% moisture, or about 1 to about 45% moisture, or up to about 15% moisture, or up to 20% moisture, or up to 25% moisture, or up to 30% moisture, or up to 35% moisture, or up to 45% moisture, and from about 5 to about 25% hydrocarbons (e.g., diesel, oil, and other hydrocarbon sources), or about 5 to about 15% of said hydrocarbons. Of course other ranges therein and amounts are possible. The hydrocarbon fraction as well as the non-hydrocarbon fractions will often contain other potential contaminants or pollutants. With the methods described herein moisture is initially removed from the drill cuttings and without being bound by theory, said initial moisture removal is integral in allowing the stabilization and re-use described herein, including providing said material with the described structural integrity; said methods include, in addition to moisture removal, removal and/or stabilization of hydrocarbons and other contaminants from within the drill cuttings. Hydrocarbons are, thus, believed to be not only contained by said methods and systems, also to be removed at least in part from the drill cuttings. Additional potential contaminants or pollutants in the drill cuttings include metals (e.g., chromium, copper, cesium, nicked, lead, barium and zinc, as representative examples) as well as contaminating salts, chlorides, or chlorine, as examples. These additional potential contaminants or pollutants are also contained and/or controlled by the methods described herein.

With said methods, the drill cuttings are initially combined with one or more drying agents. The drill cuttings do not require any further modification prior to initially combining with the one or more drying agents. For example, prior to initially combining with the one or more drying agents the drill cuttings do not need to be thermally treated. The drill cuttings do not need to be further subjected to processes that liberate gases and/or evaporate liquids prior to initially combining with the one or more drying agents. The drill cuttings do not need to be further screened prior to initially combining with the one or more drying agents. The drill cuttings do not need to be further milled prior to initially combining with the one or more drying agents. The drill cuttings do not need to be formed into a fine powder prior to initially combining with the one or more drying agents. The drill cuttings do not need to be compressed and/or pelletized prior to initially combining with the one or more drying agents. The drill cuttings when combined with the one or more drying agents are generally provided as wet drill cuttings or as mud-like or as slurry-like aggregated drill cuttings.

In some embodiments, the drill cuttings may be initially screened to remove drilling mud (or a portion thereof) in processes known to those of skill in the art (e.g., conveying on shakers with screens for recycling at least a portion of the mud). In some embodiments, the drilling mud has been at least partially removed from the drill cuttings, which offers an opportunity for the drilling mud to be recycled. In some embodiments, one may further subject the drill cuttings or at least a portion of the drill cuttings to a grinder that reduces the size of at least some of the aggregates in the drill cuttings prior to initially combining with the one or more drying agents. In some embodiments, it may be preferred that a portion of the aggregates in the drill cuttings are larger than another portion of the drill cuttings. This combination of larger and smaller sized aggregates will, in some embodiments, increase the overall strength of the final material produced, which includes material formed by the methods described herein and/or when solidified. Having a combination of larger and smaller sized aggregates allows a lock-in fit with the different sized aggregates and between the different sized aggregates, providing less gaps between aggregates when later formed as a re-used and/or solidified material.

The drying agent will have an alkaline pH, a high amount of calcium carbonate and a low pozzolanic activity. In some embodiments, the amount of calcium carbonate is greater than about 40 wt. %. In some embodiments, the amount of calcium carbonate is greater than about 50 wt. % or is greater than about 60 wt. % or is greater than about 70 wt. % or is greater than about 80 wt. % or is greater than about 90 wt. %. The calcium content may be contained in a combination of calcium carbonate and/or calcium oxide. The drying agent has, itself, only a very low or even negligible amount of moisture and is capable of moisture absorption. In some embodiments, the drying agent will have only a low or very low amount of crystalline silica. In many embodiments, the amount of crystalline silica is from 0 to about 10 wt. %. In some embodiments, the amount of crystalline silica is less than about 10 wt. %, or is less than about 9 wt. %, or is less than about 8 wt. %, or is less than about 7 wt. %, or is less than about 6 wt. %, or is less than about 5 wt. %. In some embodiments the amount of crystalline silica is negligible, or is from about 0 to about 5 wt. % or is from about 0 to about 4 wt. %, or is from about 0 to about 3 wt. %, or is from about 0 to about 2 wt. %, or is from about 0 to about 1 wt. %. In some embodiments, the drying agent will have an amount of silicon dioxide that is less than or is a lot less than other ashes (combustion by products), such as Class F fly ash, blast furnace slag and bottom ash. In some embodiments, the drying agent will be an ash with a lower amount of silicon dioxide. A representative examples of a drying agent is kiln dust or at least partially calcined kiln feed which is removed from and collected, for example, in a dust collector during the manufacture of cement or lime. In one or more forms the kiln dust is cement kiln dust or lime kiln dust. Preferably the cement kiln dust when used is from the manufacture of Type I Portland cement. Other representative examples of a drying agent include but are not limited to stacking dust and lime, each having an alkaline pH. Class C fly ash having a much reduced silicon dioxide amount (e.g., when not considered pozzolanic, not considered a strong cementitious reactant) may also be used. Still further, the drying agent may be or may include caliche preferably in powdered or particulated form, which typically has a calcium carbonate content of about or greater than about 70% or 80%. Still further, the drying agent may be or may include natural hydraulic lime in powdered or particulated form.

The drying agent is introduced generally as a fine particulate material. The particulates will have a size in a range from about 0.5 microns to about 800 microns and generally less than about 1000 microns. Various ranges therein may be provided, without limitation when desired. Such ranges may include but are not limited to 0.5 microns to about 10 microns or from about 0.5 microns to about 20 microns or from about 1 micron to about 100 microns or from about 20 microns to about 200 microns or from about 100 or about 200 microns to about 800 or about 1000 microns or from about 20 microns to about 500 microns or from about 100 microns to about 1000 microns.

When more than one drying agent is introduced, overall properties of the one or more drying agent will be such that, in total, the amount of calcium oxide is greater than as described above (e.g., greater than about 40 wt. %). In addition, in total, the moisture content of the one or more drying agents will be very low or even negligible. In total, the one or more drying agents will be capable of moisture absorption. Moreover, in total, the amount of crystalline silica in the one or more drying agents should not be more than about 10 wt. %, or the total amount of crystalline silica will be less than about 10 wt. %. Similarly, in total, the drying agent(s) should not be considered strong pozzolans, or agents considered to behave as a strong cementitious reactant.

When the one or more drying agent is initially introduced to the aggregated drill cuttings, the combination with drill cuttings is generally considered to be in a first state. The first state is generally depicted as having a moisture content defined primarily as being dryer than or having a moisture content that is less than that of the drill cuttings. Thus, the moisture content of the first state may be from about 1 to about 10%, or from about 5 to about 15%, or from about 5 to about 40%, or from about 1 to about 40%, or from about 1 to about 45%, or up to about 15%, or up to about 20%, or up to 25%, or up to 30%, or up to 35%, or up to 45%. Collectively, the drying agent(s) and the drill cuttings together form a first combination.

The amount of drying agent(s) introduced with the drill cuttings may range from about 0.5% to about 20% of the quantity of drill cuttings, or in any various range therein. For example, the drying agent(s) may be in an amount (based on weight of drill cutting) ranging from about 3% to about 15% or from about 5% to about 10%, or from about 5% to about 15%, or up to about 10%, based on the quantity (by weight) of the drill cuttings.

Figure 4:
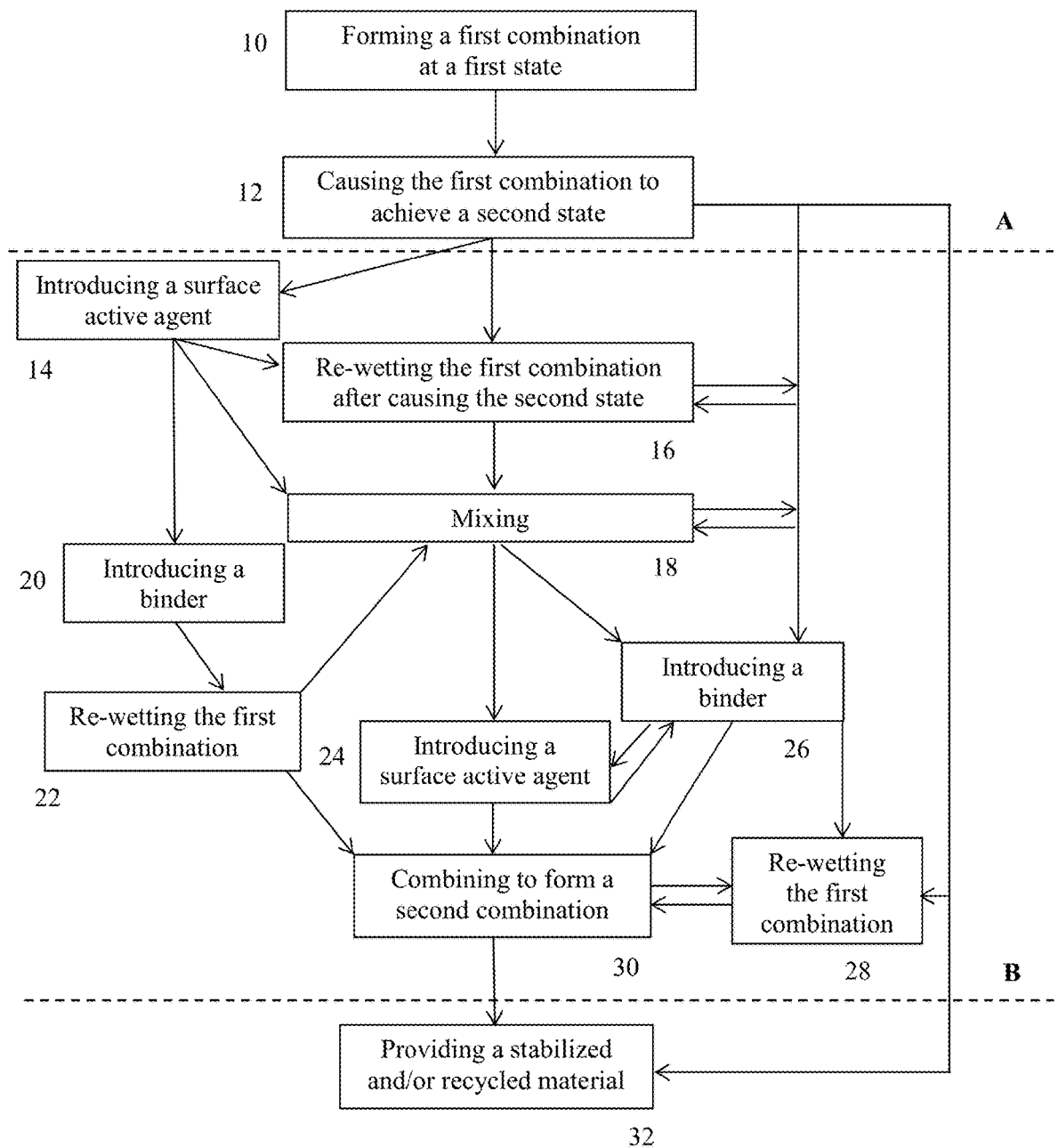
FIG. 4 depicts further representative processes described herein.

Generally, the one or more drying agent is combined with the drill cuttings using a unit for blending, such as a mixer, blender, blending device or other similar unit or means for blending that is known in the art for blending or combining aggregate materials. A suitable example is a pug mill having a hopper or feed assembly through which the drying agent and the drill cuttings are fed. Another example is a unit or machine comprising an auger screw. A further example is a skid steer comprising at least a mixer or mixing unit. Said machinery may be centrally stationed or may be local, such as near a drilling site, and one or more may be moveable and/or portable. In some embodiments, the drill cuttings and drying agent(s) are introduced into the unit for blending; this may be done in series (with no particular order) as represented with FIG. 1A or simultaneously as represented with FIG. 1B. In some embodiments, the one or more drying agent(s) are introduced with the drill cuttings (in no particular order) and then the unit for blending is introduced as represented with FIG. 1C. After combining the drill cuttings with the drying agent (through utilizing the unit of blending) an output is formed also referred to as a first combination. With any of FIGS. 1A-1C, the drill cuttings (boxes 1, 5, 7) and drying agent(s) (boxes 2, 4, 7) are introduced, and comingled via the unit of blending to form said output or first combination (boxes 3, 6, 9). This is also depicted in FIG. 4, box 10.

In some embodiments, the combining (blending or comingling) of the components described herein, which includes the one or more drying agent and the aggregated drill cuttings, may be performed at an ambient temperature. In addition, in some embodiments, the unit of blending or utilizing the means for blending may include a heater or cooler compartment or means for heating or cooling, so that the methods described herein include one or more steps of heating and/or cooling. Said heating and/or cooling may, depending in part on the configuration and means for heating or cooling, be performed prior to, during and/or after blending. As such, the one or more steps of heating and/or cooling may take place prior to forming the first combination, at the time of forming the first combination or after forming the first combination, when a temperature change is desired or is necessitated. As depicted in FIG. 4, upon forming a first combination in a first state (box 10), there is a subsequent causing of the first combination to achieve a second state (box 12). Causing the first combination to achieve the second state may also occur prior to, during or after heating and/or cooling, when a temperature change or temperature changes are desired or are necessitated. For example, in some embodiments, combining (blending or comingling) of the one or more drying agent and the aggregated drill cuttings to form the first combination, as depicted in FIG. 4, box 10, will be performed at or near the same temperature as the temperature of the components or at or near the same temperature as the ambient temperature. This may include a small change in temperature between the initial temperature of the components and the temperature during blending, such as about 20 degree (F.) (or about 11 degree C.) or less than 20 degree (F.) (or about 11 degree C.) difference between the initial temperature of the components and the temperature during blending. There is often no more than about 20 degree (F.) (or about 11 degree C.) difference between the temperature of the components and the temperature during blending.

With any further addition of heat (when desired, and which may occur prior to, during or after blending), it will always be at a temperature less or much less than a temperature used to thermally cure a hydraulic material (e.g., less or much less than about 140 degrees C.). With cooling (hen desired, and which may occur prior to, during or after blending), the temperature will always be a temperature that does not promote freezing. In some embodiments, cooling temperatures assist when outside temperatures are very high. For example, cooling temperatures may be applied to reduce the temperature after blending, such as to keep temperatures near or within about 20 degrees of the initial temperature (e.g., prior to the blending).

Figure 2:
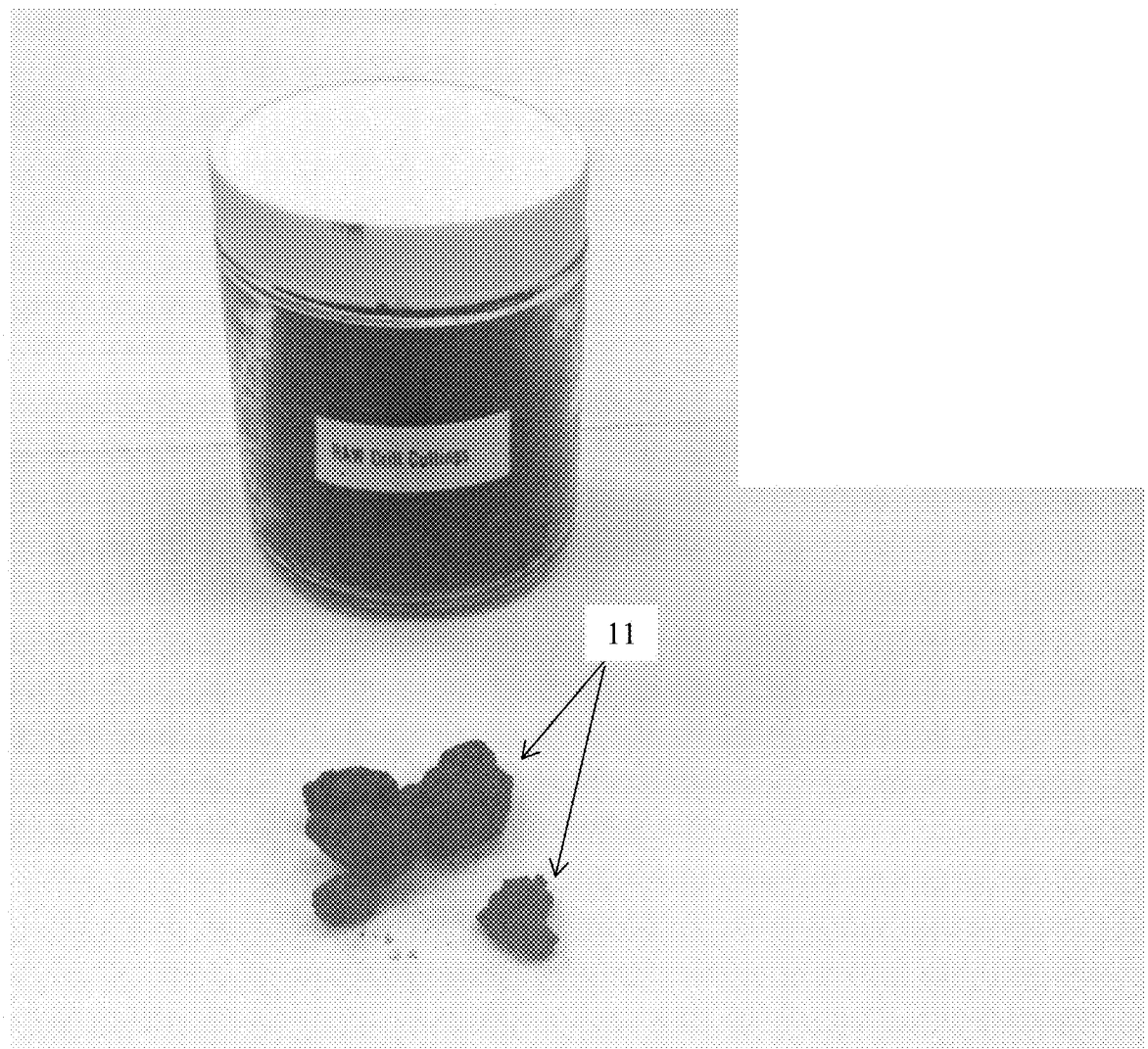
FIG. 2 depicts initial drill cuttings when aggregated as described herein.
Figure 3:
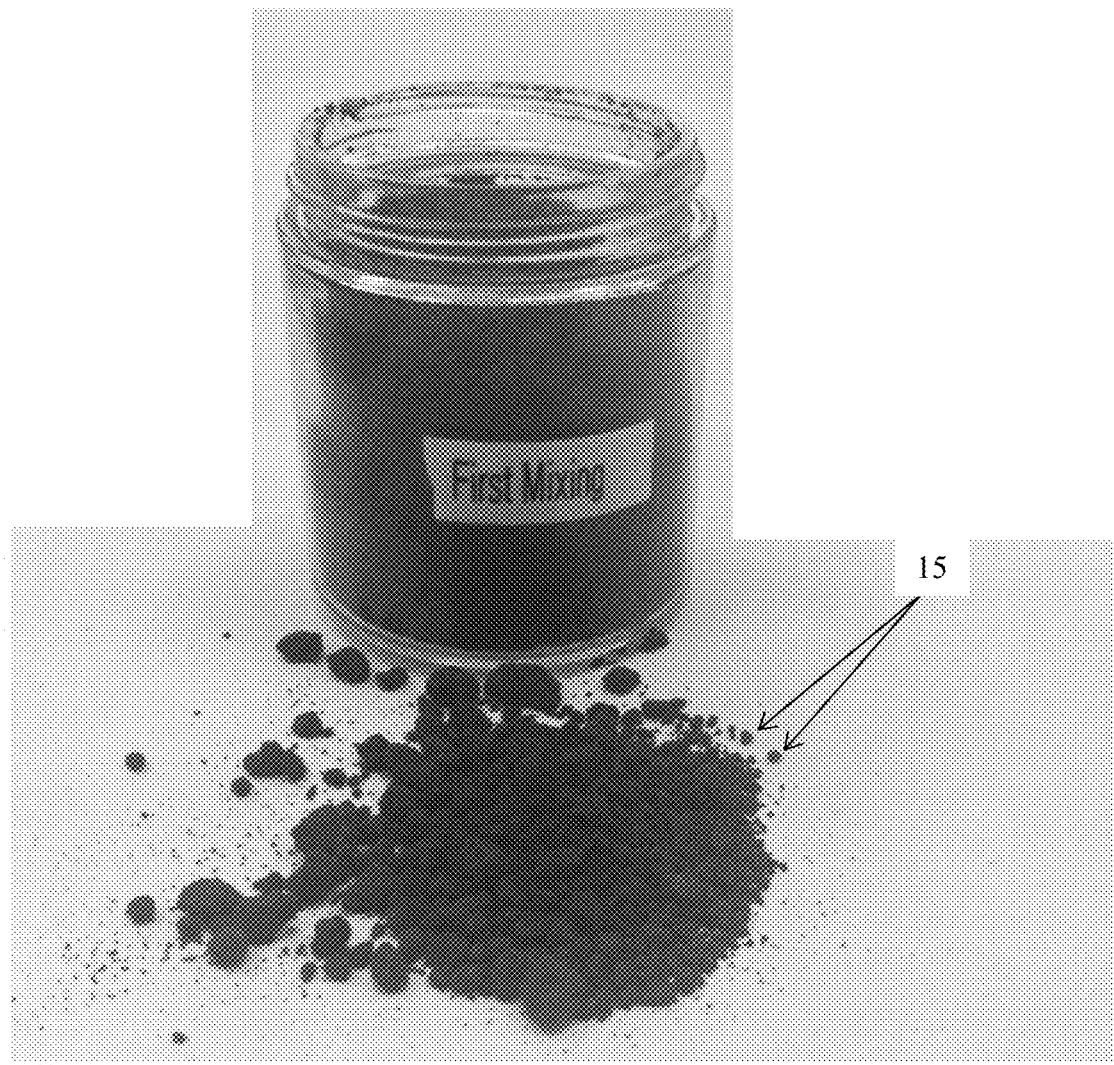
FIG. 3 depicts a representative first output as a first combination in a second state as described herein.

Output after blending (e.g., FIGS. 1A-1C, boxes 3, 6, 9, and FIG. 4, box 10) utilizing the unit for blending will have a reduced moisture content, less moisture than the amount of moisture in the initial drill cuttings. The output may initially have a reduced overall density (less density than that of the initial drill cuttings) with the reduction in moisture content. Without being bound by theory, the drying agent(s) essentially remove an amount of moisture and assist, therefore, in removing and/or reducing overall moisture contained in the aggregated drill cuttings, the moisture in the drill cuttings containing aqueous or nonaqueous hydrocarbons and other potential contaminants. Thus, while the initial aggregated drill cuttings include large aggregated masses or were provided as an aggregated slurry, with the moisture reduction described herein, the material formed as output (when utilizing the processes described herein) will be provided as a plurality of more individualized particulates. FIG. 2 illustrates representative examples of large aggregated masses 11 as can be found with initial drill cuttings. FIG. 3 illustrates representative individualized particulates 15 from the plurality of individualized particulates as found with output after comingling or blending the large aggregated masses (drill cuttings) with the drying agent(s) described herein.

Figure 1B:
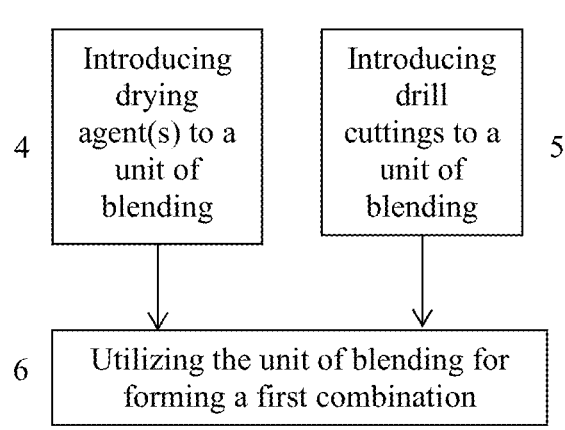
Figure 1C:
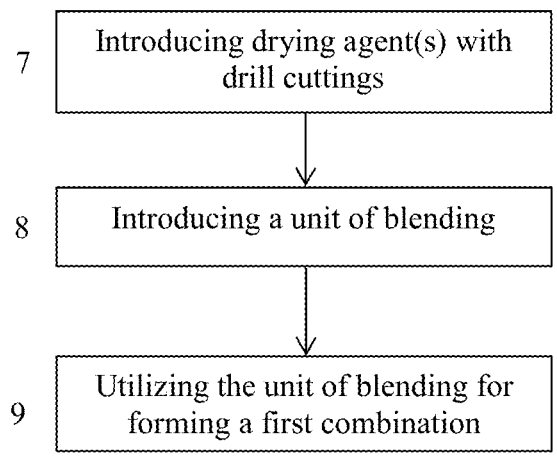

As such, as described herein, output after blending, such as described with FIGS. 1A-1C (e.g., boxes 3, 6, 9) is considered a particulated output as compared with the large aggregated masses or the aggregated slurry of the initial drill cuttings.

Moisture reduction and/or removal described herein, as depicted in Stage A, FIG. 4, preferably includes a two step process for reduction and/or removal of moisture contained within and/or bound within the aggregated components of the drill cuttings of FIGS. 1A-1C (boxes 1, 5, 7) that have an inherent porosity, said aggregated components of the drill cuttings having been aggregated into the larger masses and/or provided as the aggregated slurry. Upon reduction and/or removal of the moisture bound or within said initially aggregated components of the drill cuttings, at least a portion of the hydrocarbons as well as other volatile components contained in said moisture are freed up, such that the contaminants and volatiles are now capable of release, in part, by evaporation, or of breaking down, such as via oxidation. Such a condition, which includes the reduction and/or removal of moisture, is considered, in some embodiments, a transition of the output or first combination from a first state (FIG. 4, box 10) to a second state (FIG. 4, box 12).

Optimum reduction in moisture content is achieved when the output after blending utilizing the unit for blending is allowed to rest for a period of time. Thus, in some embodiments, the output having the reduced moisture content is obtained when the first combination has a reduced moisture state with a desired reduction in moisture content, or has achieved the desired reduction in moisture content in the second state. The reduction in moisture content includes a reduction in moisture as compared with the initial drill cuttings, and may include a transition in moisture level or moisture content from a first state to a second state, as depicted in boxes 10 and 12 of FIG. 4. The second state will have a reduced moisture content as compared with the first state. The reduced moisture content in the second state is less than the moisture content in the first state. This reduction (from initial drill cuttings to second state) may be about 20 wt. % reduction in moisture content, or may be about 25 wt. % reduction, or may be about 30 wt. % reduction, or may be about 35 wt. % reduction, or may be about 40 wt. % reduction, or may be about 45 wt. % reduction, or may be about 50 wt. % reduction, or may be greater than 50 wt. % reduction, or any range therein, in which there is generally at least a 20 wt. % reduction in moisture content in the second state as compared with the moisture content in the initial drill cuttings. Because of the low pozzolanic activity of the drying agent(s), the output (i.e., when the drying agent(s) is comingled with the drill cuttings) will not solidify (e.g., will not solidify at a first state or at a second state).

Figure 6:
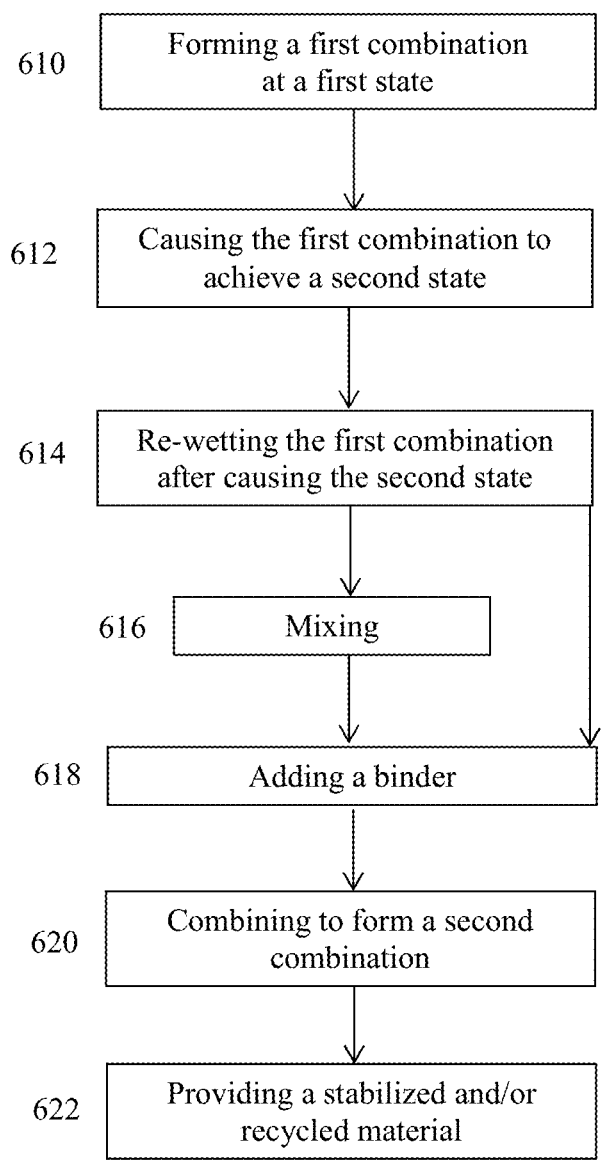
Figure 7:
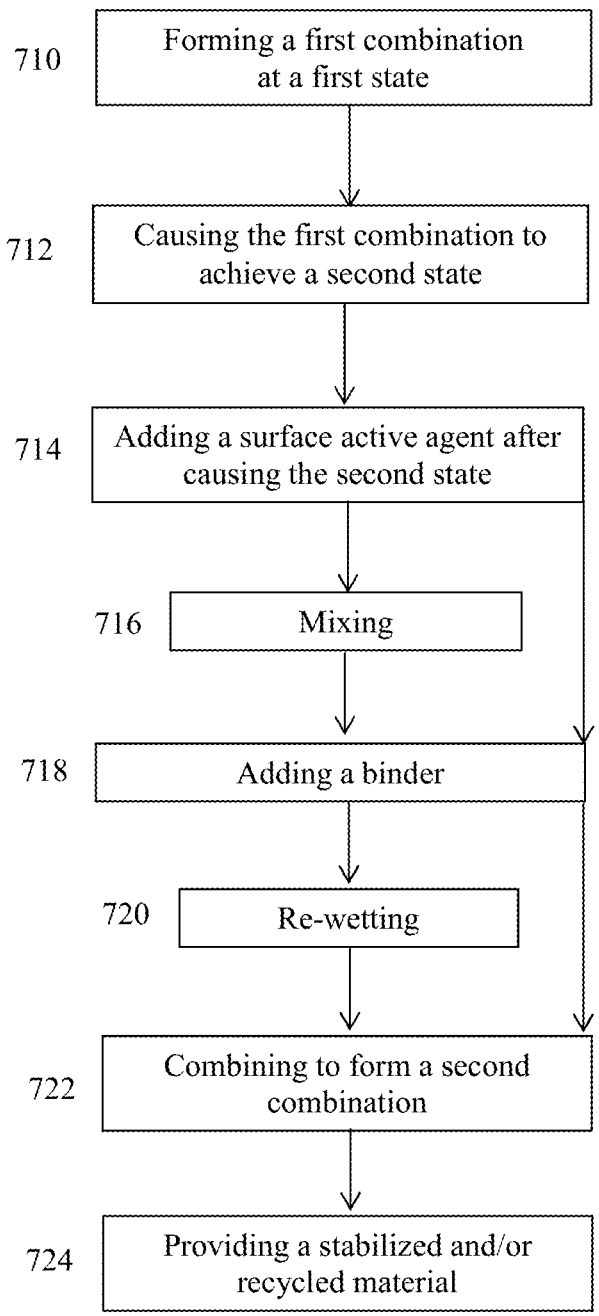
Figure 9:
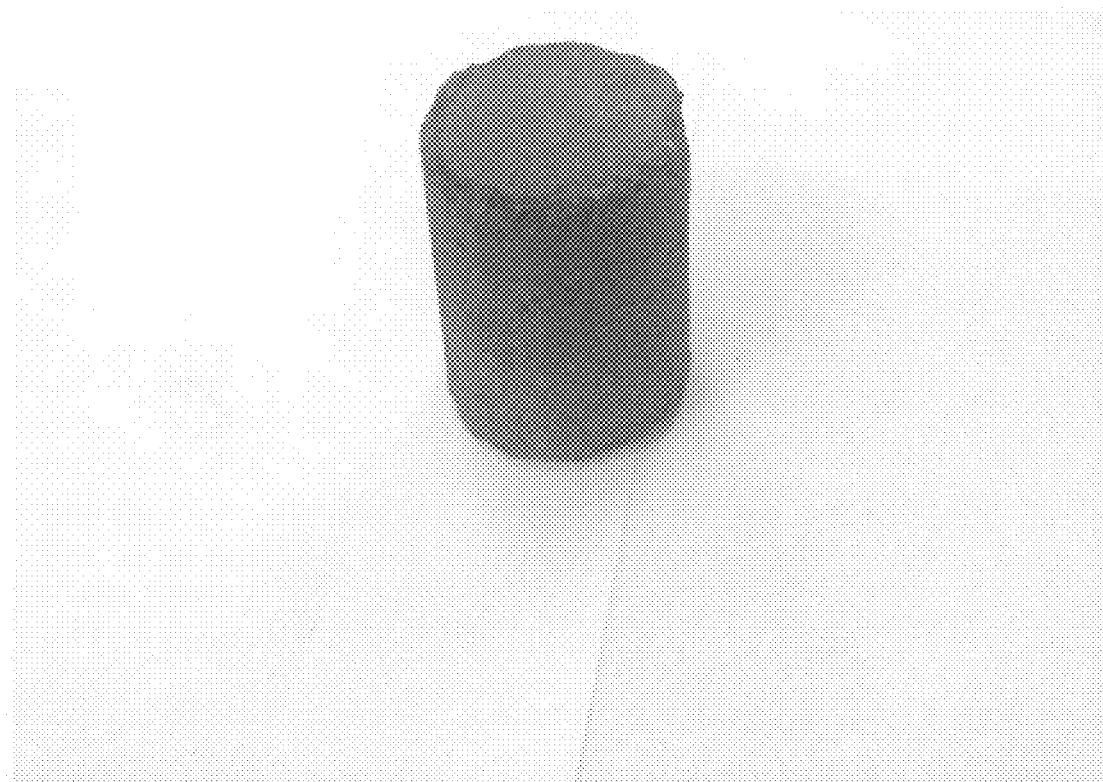
FIG. 9 illustrates a second combination described herein after compaction.

To cause the first combination to achieve the second state, the output may rest at an ambient temperature or at a higher than ambient temperature. The higher temperature should be less than a temperature that is used to thermally cure a hydraulic material (e.g., less or much less than about 140 degrees C.). The higher temperature may be sufficient to completely or nearly completely dry the output, thereby lessening the time for resting. The higher temperature may be achieved by introducing additional heat to the output. If output is allowed to simply rest, the rest period may be about 24 hours or at least 30 hours or about 72 hours, or at least a few days, or up to a week, or may be greater than a week. The rest period may also be at least for a week (e.g., at least about seven days), or may be more than a few weeks. In some embodiments, the output may simply rest (generally without introducing additional heat) for some period of time before further use. This period of time may be about at least five days to ten days for drill cuttings obtained from a drill hole and provided as an output. In some embodiments, the rest period may be at least about seven days for output that originated from a drill or well hole. Longer periods are effective as well. There does not appear to be a detrimental effect when the output rests for longer periods. The output when caused to achieve the second state remains particulated, considered (using jargon) to be crumbly, and is no longer aggregated in the large aggregated masses or as an aggregated slurry. The output when in the second state, does not solidify on its own and does not readily aggregate (form a larger cohesive mass) on its own. For example, the output when in a second state does not re-aggregate into large aggregated masses, such as when the particulates of the second state are pressed together by hand. Achieving the second state provides a composition with structural integrity and strength. Thus, when the first combination in the second state is used (FIG. 4, box 32; FIG. 6, box 612; FIG. 7, box 712) or is further formed to provide a final composition (FIG. 4, boxes 14-30; FIG. 6, boxes 614-622; FIG. 7, boxes 714-724), there is a structural integrity and strength that is achieved. This differs from alternative processes in which the described second state, which occurs as depicted in FIG. 4, Stage A (also in FIG. 6, boxes 610-612; FIG. 7, boxes 710-712), is not achieved.

In one or more embodiments, the second state is a friable state. In one or more embodiments, the output after blending, when in a second state (with a period of rest), is a particulated output and will not on its own form a molded cohesive mass, such as, for example, when a quantity of the output is gently pressed together (e.g., by hand). In one or more embodiments, the output in a second state is when the moisture content is less than optimum moisture for compaction (e.g., in accordance with the American Association of State Highway and Transportation Officials (AASHTO), T-99 or T-180). In some embodiments, the output is best in a second state when the moisture content is about 3 to about 5 percentage points less than optimum moisture content for compaction (e.g., in accordance with the AASHTO T-99 or T-180). In some embodiments, the output in a second state is when the moisture content is more than about 5 percentage points less, or more than about 6 percentage points less, or more than about 7 percentage points less, or more than about 8 percentage points less, or more than about 9 percentage points less, or more than about 10 percentage points less, or from between about 8 and about 10 percentage points less than optimum moisture for compaction, such as in accordance with AASHTO T-99 or T-180.

In view of the methods described herein, reduction in moisture (e.g., reduced moisture content) of the drill cuttings is due in part from evaporation. Reduction in moisture is due in part from absorption. Some moisture reduction may also be due in part from drainage. The drained moisture, however, will not typically contain an amount of contaminant or pollutant that must be contained or further treated. When desired, a means for collecting the drained moisture is also acceptable and may be included with the described method.

The output, which, when caused to form a first combination in a second state, has a reduced moisture content from that of the aggregated (initial) drill cuttings and is a stabilized material, as depicted in FIG. 4, box 32. The output, when formed as a first combination in a second state will have a reduced moisture content from that of the aggregated (initial) drill cuttings and is a recycled material that is suitable for re-use. With the processes described herein, the initial drill cuttings transition from a moisture bound state (initial state) to a first state (FIGS. 1A-1C) and are caused to transition to a suitable reduced moisture state (second state; FIG. 4, 6, 7) to provide the stabilized material and/or the recycled material. As an example, when the moisture bound state of the initial drill cutting (e.g., provided as aggregated drill cuttings or as the aggregated slurry), as previously described, includes up to about 15% moisture after drilling. The reduced moisture state, as described herein, and after introducing and incorporating the drying agent(s) in the manner and quantity described herein, may have a total moisture content of less than about 12% in the second state, which is a reduction of about 20% in the total moisture content. The total moisture content in the reduced moisture state (second state) may also be less than about 10%, which is a reduction of about 33% in moisture from the moisture content in the initial drill cuttings. In some embodiments, the reduced moisture state may be about 25% or less, or about 20% or less, or less than about 20%, or less than about 19%, or less than 18%, or less than 16%, or less than 15%, or less than 14%, or less than 13%, or less than 12%, or less than 11%, or less than 10%, or less than 9%, or less than about 8%, or less than about 7%, or less than about 6% or less than about 5%, or may be from about 3% to about 8%, or from about 5% to about 12%, or from about 5% to about 20%. The latter reduced moisture state shows that the moisture content may be reduced by as much as 66% or even greater than 66% by methods described herein. In some embodiments, the reduced moisture state as described herein will have moisture content that is less than optimum moisture content for compaction. In some embodiments, moisture content in the reduced moisture state is at least about 3% less than optimum moisture content for compaction. In some embodiments, moisture content in the reduced moisture state is more than 5% less than optimum moisture content for compaction. In some embodiments, moisture content in the reduced moisture state is from anywhere between about 6% to 10% less than optimum moisture content for compaction. The stabilized and/or recycled material provided after causing the first combination to achieve a second state, as depicted in box 32, FIG. 4, is, as described above, a particulated material. Said material may be deemed a recycled, non-hazardous material suitable for re-use. Said material may be considered a remediated material. This material may be stored or may be re-used as further described below.

For re-use, the stabilized and/or recycled material, that is, the material having the reduced moisture state (after utilizing the unit of blending with output therefrom forming the first combination and then causing the second state), may be a stabilized and/or recycled material suitable as a sub base or a sandy, non plastic material, meeting the performance criteria of a sub base or a sandy, non plastic material. For example, said stabilized and/or recycled material can have a compressive strength of between about 25 to 100 psi, or may have a compressive strength of at least 35 psi for use as a sub base or as a sandy, non plastic material.

For re-use, the stabilized and/or recycled material, that is, the material having the reduced moisture state (after utilizing the unit of blending with output therefrom forming the first combination and then causing the second state), may be used after achieving the second state. This final material as described herein may have a compressive strength that is at least about 35 psi. Said final material having a compressive strength of at least 35 psi is suitable for use as a sub base road material or as a sandy non plastic road material.

In additional embodiments the material having the reduced moisture state (second state) may be further blended with one or more additional components (e.g., FIG. 4, boxes 14, 20, 24, 26). Introduction of the one or more additional components occurs after the first combination is in the second state, meaning the moisture content has been reduced from the initial state (drill cuttings) and from the first state (first combination), or has completed Stage A, as depicted in FIG. 4. One representative additional component is a binder or at least one binding agent, such as a hydraulic binder or non-hydraulic binder (with or without additional components, such as fillers, fibers, additives, etc.). In addition or as alternative, another representative additional component that may be included is a surface acting agent with characteristics of a surfactant that lowers the surface tension. The surface acting agent may be provided as a detergent, dispersant, wetting agent, and/or emulsifier, foaming agent. The binder and/or surface acting agent (in addition to other added components) may be provided in no particular order in Stage B (see, e.g., FIG. 4).

With introduction of the additional components, such as binder(s) and/or surface acting agent(s), re-wetting of the first combination (in the second state) is necessary in order to form a second combination that will solidify (e.g., FIG. 4, boxes 16, 22, 28; FIGS. 6-7). Thus, a component having some moisture (aqueous or non-aqueous or combination thereof, such as an emulsion) is introduced to the first combination when in the second state. Re-wetting may occur either prior to, during or after introduction of the additional components, such as binder(s) and/or surface acting agent(s). Re-wetting may include a re-hydration of certain components, such as when solidification involves a hydration reaction. Water or an aqueous liquid or solution will, in some embodiments, be added in addition to the binder (either together in a mixture or independently, before, or after) in the re-wetting phase. Re-wetting may include a melting, digesting or cooking of components followed by hardening and/or curing of components. The binder may include a non-aqueous liquid or solvent or melt, or an emulsion or dispersion, in some embodiments, in which the binder is generally introduced with the non-aqueous liquid or solvent or melt, or as an emulsion or dispersion, such that the binder is in a mixture/emulsion/dispersion/melt, although in some instances, the binder may be provided independently, or provided before, or after additional components. Addition of any one or more of the binder with or without additional components provides a second combination (e.g., FIG. 4, box 30). The second combination when formed (e.g., solidified) is also a stabilized and/or recycled material, suitable for use. Thus, as described herein, output as the first combination in the second state, when further blended with at least binder(s) and/or surface acting agent(s), forms the second combination, requiring re-wetting to solidify, as depicted in FIG. 4, Stage B, boxes 14-28.

A second combination having the one or more additional components, such as binder(s) and/or surface acting agent(s), is required to form a solidified stabilized and/or recycled material. For hydration reactions, re-wetting or re-hydration includes a transition from the reduced moisture state to a wetted state, which occurs before solidification. This described process is contrasted against preparations disclosed by others, in which their output after blending, even when performed with a so-called drying agent, does not provide a comparative combination having a reduced moisture content as described herein, and therefore, has instead a higher moisture content than what is described herein. Said alternative preparations do not disclose transitioning from a first state to a second state, in which the second moisture state is a dried or a friable state. The reduction in moisture content described herein to a dried or friable state ensures adequate stabilization and/or solidification thereafter. In preparations disclosed by others that do not cause the transition from the first state to the second state, moisture of these so-called comparative combinations will already have moisture content that is several percentage points higher than the optimum moisture content for compaction (e.g., in accordance with AASHTO T-99 or T-180), meaning that these other so-called comparative combinations (those disclosed by others) will start with have a higher moisture content in said preparations that are going to be solidified.

As described herein, when fully blended as the second combination, a final material (e.g., a stabilized and/or recycled material for re-use) will have been or will undergo re-wetting (re-hydration or re-moistening or melt before undergoing a solidification reaction, such as a curing, hardening, hydration reaction, hydraulic reaction, and/or non-hydraulic reaction, thermal decomposition, evaporation, etc.) As long as at least one binder (with or without additional components, such as surface active agent(s), fillers, fibers, polymers, additives, etc.) is introduced in the manner described herein with or in a re-wetting step (such as in Stage B of FIG. 4, or after box 12 of FIG. 4, or boxes 614-622 of FIG. 6, or boxes 714-724 of FIG. 7, or boxes 814-820 of FIG. 8) to form the second combination, no further additive is required in order for a fully blended final combination as described herein to solidify. In hydration reactions, the amount of water is provided in an amount typically included for dried components to undergo a hydration reaction and to solidify. With emulsions, dispersion, or melts or cooked mixtures, the amount of binder may be higher when the particulates obtained from the first combination in the second stage are small. A fully blended final combination as described herein may undergo further shaping (e.g., forming as a sheet, forming on a pallet or bed, or otherwise molding or shaping) or may be used as a filling material, such as in a bore hole or frac hole, or may be laid as a road base material. As a road base material, the stabilized materials described herein may be laid either before or after re-wetting.

Figure 8:
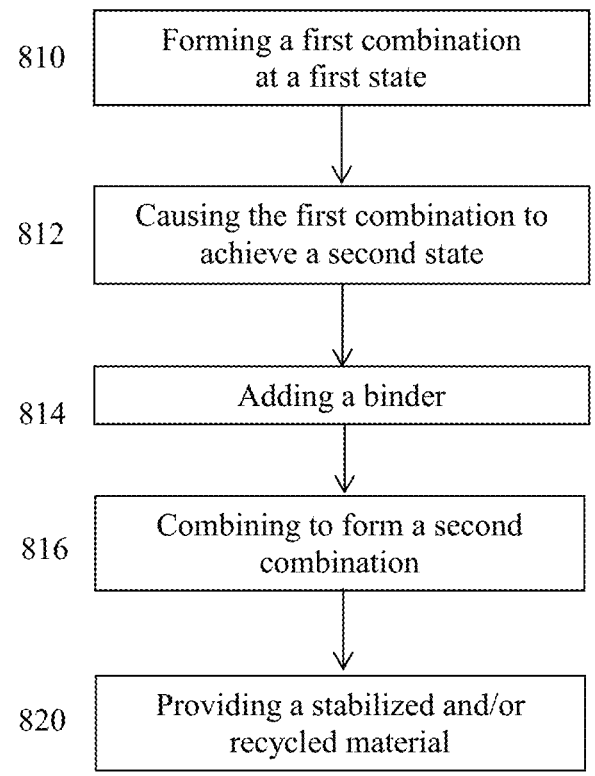
FIGS. 6-8 depict still further representative processes described herein.

In additional embodiments, when fully blended as the second combination, a final material (e.g., a stabilized and/or recycled material for re-use) will be blended with a binder that hardens or solidifies without addition of water. Such binders are often provided as emulsions. As depicted in FIG. 8, the methods described may also include forming a first combination from a first state (box 810) to a second state (box 812) and adding at least one binder (with or without additional components, such as surface active agent(s), fillers, fibers, other additives, etc.) in which the binder is in a non-aqueous phase (box 814), which are combined to form the second combination (box 816). Again, in some embodiment, no further additive may be required in order for a fully blended final combination as described herein to solidify, said material when finally formed providing a stabilized and/or recycled material (box 820). The binder is provided in an amount typically included when undergoing emulsion-type solidification or curing. When fully blended, this final combination described herein may undergo further shaping (e.g., forming as a sheet, forming on a pallet or bed, or otherwise molding or shaping) or may be used as a filling material, such as in a bore hole or frac hole, or may be laid as a road base material.

Figure 5:
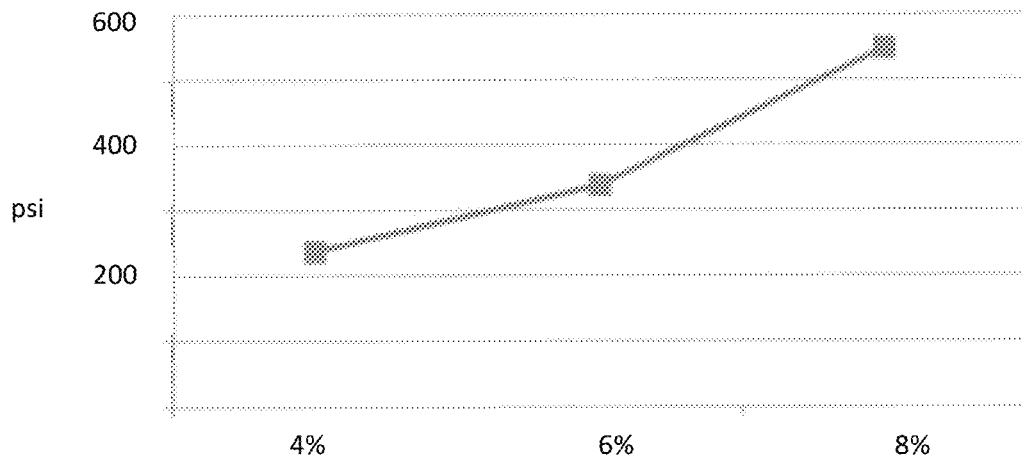
FIG. 5 illustrates a relationship between compressive strength and an amount of hydraulic binder provided with a known quantity of drill cuttings.

When fully solidified, the final material described herein (e.g., after solidification and/or rewetting and curing/hardening) may have a compressive strength that exceeds 150 psi. The compressive strength may also be about or greater than about 200 psi. The compressive strength may be as high as 400 psi or higher. The compressive strength obtained is consistent with the compressive strength that is obtained from a solidified hydraulic material formed without the output described herein (that is, without the combination of drill cuttings and one or more drying agent). Thus, knowing a compressive strength of the binder described herein (in which the binder is a binder material, such as a hydraulic binder) will provide an estimate of the compressive strength of a final material described herein. For example, FIG. 5 depicts a compressive strength measurement of various amounts of binder material after blending with drill cutting and solidifying the binder and drill cuttings, in which the binder was a cementitious binder comprising Portland cement and was added to the drill cuttings in amounts ranging from 4% to 8% by weight of the drill cuttings. The compressive strengths in FIG. 5 are similar to what would be obtained from a final material described herein that included the output described herein having been processed as described herein, when said output transitioned from the first to second state before blending and re-hydrating with said cementitious binder. Thus, a final material described herein when solidified, may, in many embodiments, be readily prepared to meet a predetermined compressive strength. In some embodiments, the final material when solidified will have, or can be designed to have, a compressive strength that exceeds that of caliche.

In the methods described herein, forming the second combination may be performed by the same unit for blending that is used to provide the first combination, or a second blending unit may be used, in which the second blending unit or unit for blending is the same or different or in line. Thus, like the first unit for blending, the second unit of blending may also be a mixer, blending device, blender or other similar unit or device that is known in the art for blending aggregate materials. The second unit for blending may, in some embodiments, include a heater or cooler or a compartment for heating or cooling prior to, during and/or after blending. For example, the second unit for blending may be a pug mill having a hopper or feeder into which output from the previous blending (e.g., first combination in the second state) is introduced, in addition to the binder and/or the surface active agent and/or additional components. Said introduction may be simultaneous, in batches, with or without water, and/or interrupted with additions of water. The second unit for blending may be a tiller or an auger-type screw, or other unit or machine having blades that can blend said first combination in the second state with the binder and/or the surface active agent and/or additional components. For example, in some embodiments, the first combination is provided on the ground, or in a pallet or on a sheet or on a liner and the binder and/or the surface active agent and/or additional components may be introduced to a surface of the first combination in the second state and then further combined to form the second combination by introducing the second unit of blending to the same surface that has the first combination thereon. The combining may occur before or after the introduction of water. Representative examples are depicted in FIGS. 6 and 7. These examples illustrate that the output as a first combination in the second state may be further blended in or with a unit for blending when introduced with additional components, at least one of which is binder and/or a reactant (reactive binder) that facilitates formation of a hydraulic reaction (e.g., a cementitious reaction) when re-wetted. The at least one binder, such as the hydraulic binder may be added in dry form, somewhat hydrated or as a slurry (hydrated). Alternatively, the binder may be in a more melt form, dispersion, and/or emulsion form.

Blending to form the second combination may be performed at an ambient temperature or may be blended under thermal conditions, in which the temperature is a temperature below that used to thermally cure the components, or at a temperature that facilitates the hydraulic reaction (which is generally between 120 and 160 or 170 degrees C., and generally not greater than about 160 or 170 degrees C.) or that facilitates the solidification reaction.

Suitable binders that serve as hydraulic binders include, but are not limited to cementitious binders, such as Sorel cement, Portland cement, pozzolana cement, gypsum cement, high alumina content cement, slag cement, silica cement, an asphalt (or asphalt-like) binder and various combinations thereof. In some embodiments, the binder as a hydraulic binder is or includes ASTM Type I Portland cement. In some embodiments, the binder, such as hydraulic binder, is introduced alone or with other components, in dry form or as a slurry. The said other components may be pre-blended with the hydraulic binder, added upstream (prior to) or downstream (after), either in wet or dry form. In some instances, the binder, such as a hydraulic binder, is added dry for better mixing. Water is then re-introduced after blending to promote the hydraulic reaction. In other instances, the hydraulic binder is added in batches, intermixed with quantities of water, which may assist in reducing dust when blending. In addition, in some embodiments a combination of binders is blended. Fillers and/or fibers may also be included. For example, filler and fibers that increase overall strength without compromising other desired properties may be used with the at least one binder. Non-hydraulic binders may also be used, such as ones that require a catalyst to initiate curing. Additional binders may be those that form a putty or are used for mortar. A binder may be or may include one or more thermoplastic resins, and/or thermoset resins. The binder may be a petroleum based binder (e.g., asphalt).

Examples of the described invention are provided below. All examples were found to be compliant with environmental standards for stabilized and/or remediated materials and may be deemed a recycled nonhazardous material for re-use, using a 7-day leachate test, a metals analysis and a chemistry analysis.

In a first example, drill cuttings in an initial state were retrieved from a drill site and combined with a drying agent on day 1, the combination was found to have a reduced moisture content (first state), which was less than the moisture content (initial moisture state) of the drill cuttings. The drill cutting themselves had varying starting (initial) moisture levels; however, moisture content always decreased after addition of the drying agent. In these examples, after incorporating the drying agent, the combination was friable, and were dried in an oven to achieve the second state. Thus, essentially, the composition transitioned from a liquid, slurry state to a dry, particulated state. Other suitable means for reducing the moisture content are acceptable, as has been previously described. The representative drying agent used was cement kiln dust and was incorporated at about 10% by weight of the total quantity of the drill cuttings.

After the above combination achieved the second state, a hydraulic binder was added to the combination of drill cuttings and drying agent. The hydraulic binder was added in varying amounts, either as 4 wt. % (F-4), 8 wt. % (F-8) or 10 wt. % (F-10), in addition to water. These additions were made on day 4. For one example, a hydraulic binder in an amount of 6 wt. % (F-6) followed by water was added on day 2, after approximately 72 hours. For all examples, the hydraulic binder was Type I Portland cement and was added dry to form a homogeneous mixture with the first combination. Water was added in these representative examples to rewet and rehydrate and initiate the hydraulic reaction. The formulations for each of F-4, F-6, F-8 and F-10 are provided in TABLE 1.

TABLE 1

|  | combination (g) | hydraulic binder (g) | water (g) |
| --- | --- | --- | --- |
| F-4 | 1332 | 53 | 50 |
| F-6 | 1294 | 78 | 52 |
| F-8 | 1331 | 106 | 72 |
| F-10 | 1346 | 135 | 77 |

F-4, F-6, F-8 and F-10 as stabilized materials were allowed to undergo a hydraulic reaction at room temperature. Before solidification, samples were extracted from each of the stabilized materials and formed into small round shaped articles. Each article was about 2¼ inches in diameter and about 3 inches thick. Two samples were extracted for F-8 and F-10, hence the tables below show F-8-A and F-8-B (TABLE 4) and F-10-A and F-10-B (TABLE 5). At periodic time points, the sample articles were evaluated to determine loss of moisture during solidification and curing, as depicted in TABLES 2, 3, 4, and 5, respectively. Each data represents an average of n=3. Wet density was measured by weighing. Dry density was measured after adding the hydraulic binder and compacting in accordance with AASHTO), T-99.

TABLE 2

|  |  | wet density (lb/ft$^3$) | dry density (lb/ft$^3$) |
| --- | --- | --- | --- |
| F-4 | Day 1 | 130 | — |
| F-4 | Day 2 | 129 | — |

TABLE 2-continued

|   |   | wet density (lb/ft³) | dry density (lb/ft³) |
|---|---|---|---|
| F-4 | Day 4 | 127 | 128 |
| F-4 | Day 7 | — | 127 |

TABLE 3

|   |   | wet density (lb/ft³) | dry density (lb/ft³) |
|---|---|---|---|
| F-6 | Day 2 | 130 | — |
| F-6 | Day 7 | — | 125 |

TABLE 4

|   |   | wet density (lb/ft³) | dry density (lb/ft³) |
|---|---|---|---|
| F-8-A | Day 3 | — | 116 |
| F-8-A | Day 6 | — | 115 |
| F-8-B | Day 1 | 129 | 118 |
| F-8-B | Day 2 | 127 | — |
| F-8-B | Day 3 | 126 | — |
| F-8-B | Day 6 | — | 125 |

TABLE 5

|   |   | wet density (lb/ft³) | dry density (lb/ft³) |
|---|---|---|---|
| F-10-A | Day 3 | — | 117 |
| F-10-A | Day 6 | — | 117 |
| F-10-B | Day 1 | 130 | 118 |
| F-10-B | Day 2 | 127 | — |
| F-10-B | Day 3 | 126 | — |
| F-10-B | Day 6 | — | 125 |

The data in TABLES 2-5-show that each stabilized material that underwent a hydraulic reaction by exhibited a loss of moisture, regardless of the amount of hydraulic binder that was incorporated therein. The dry density provides an indication of the relative strength of each of the stabilized material at that time period because of a known correlation between dry density and strength, as previously described, and shown in TABLE 6. Thus, when only dry density values have been evaluated, compressive strength may be predicted.

Referring again to FIG. 5, the drawing shows the compressive strengths for a hydraulic binder comprising Type I Portland cement, at the quantities shown in TABLE 6, i.e., 4 wt. % (C-4), 6 wt. % (C-6), or 8 wt. % (C-8) of drill cuttings. Said compressive strengths were measured from similar size and shaped articles as prepared for TABLES 2-5 (e.g., a diameter of about 2¼ inches and a thickness of about 3 inches), were allowed to solidify for 7 days prior to testing and evaluated for moisture and dry density (modified slightly from but in accordance with Texas Department of Transportation 113E) and compressive strength (in accordance with ASTM D1633). The data in TABLE 6 represents an average of n=2. Thus, a figure prepared with any specific hydraulic binder may be used to predict the compressive strength of materials (second combinations provided as stabilized, solidified and/or recycled materials) as described herein when made with that specific hydraulic binder. Accordingly, the dry densities of F-4, F-6, F-8-A, F-8-B, F-10-A and F-10-10-B, which included the hydraulic binder comprising Type I Portland cement, may be used to predict the compressive strength, such as shown in TABLE 6 and FIG. 5. In view of TABLE 6, each of articles F-4, F-6, F-8-A, F-8-B, F-10-A and F-10-10-B achieved a compressive strength in excess of 200 psi.

TABLE 6

|   | dry density (lb/ft³) | moisture | compressive strength (psi) |
|---|---|---|---|
| C-4 | 118 | 12.3 | 237 |
| C-6 | 115 | 13.4 | 338 |
| C-8 | 117 | 12.45 | 548 |

Additional samples from each of the stabilized examples F-4, F-6, F-8 and F-10, were evaluated utilizing 7-day leachate tests, for petroleum hydrocarbons, in accordance with Laboratory Procedures for Analysis of Exploration & Production Waste, for parameters under Louisiana Administrative Code 43:XIX, subpart 1, and analyzed in accordance with Texas Commission on Environmental Quality, TCEQ Method 1005. These data are presented in TABLE 7, in which MDL is method detection limit, SQL is sample detection level, and MQL is method quantification limit. The results in TABLE 7 were compared to known samples of 1-choloroctadecane and 1-chlorooctane, each of which presented results having a greater than 97% accuracy level. The results of TABLE 7 demonstrate that none of the stabilized and/or recycled materials were found to leach detectable amounts of hydrocarbons.

TABLE 7

|   |   | MDL | SQL | MQL | Result (mg/dL) |
|---|---|---|---|---|---|
| F-4 | C6-C12 | 1.05 | 0.10 | 1.0 | <0.10 |
|   | C12-C28 | 0.96 | 0.10 | 1.0 | <0.10 |
|   | C28-C35 | 1.13 | 0.11 | 1.0 | <0.11 |
| F-6 | C6-C12 | 1.05 | 0.10 | 0.98 | <0.10 |
|   | C12-C28 | 0.96 | 0.09 | 0.98 | <0.09 |
|   | C28-C35 | 1.13 | 0.11 | 0.98 | <0.11 |
| F-8 | C6-C12 | 1.05 | 0.10 | 0.98 | <0.10 |
|   | C12-C28 | 0.96 | 0.09 | 0.98 | <0.09 |
|   | C28-C35 | 1.13 | 0.11 | 0.98 | <0.11 |
| F-10 | C6-C12 | 1.05 | 0.11 | 1.0 | <0.11 |
|   | C12-C28 | 0.96 | 0.10 | 1.0 | <0.10 |
|   | C28-C35 | 1.13 | 0.11 | 1.0 | <0.11 |

Metals testing was performed on the stabilized materials of examples F-4, F-6, F-8 and F-10, in which samples were retrieved after addition of the hydraulic binder and a period of solidification for 7 days. These testings were in accordance with Environmental Protection Agency, EPA Method 6010B and EPA Method 7471B. Data are presented in TABLE 8 and show that the stabilized and recycled materials did not release potentially contaminating metals that are in excess of standards set by the EPA.

TABLE 8

|   |   | MDL | SQL | MQL | Result (mg/kg) |
|---|---|---|---|---|---|
| F-4 | arsenic | 0.162 | 0.004 | 0.022 | 1.10 |
|   | barium | 0.206 | 0.005 | 0.022 | 2.03 |
|   | cadmium | 0.137 | 0.003 | 0.022 | 0.03 |
|   | chromium | 0.245 | 0.005 | 0.022 | 0.67 |
|   | lead | 0.126 | 0.003 | 0.022 | 1.82 |

TABLE 8-continued

|  |  | MDL | SQL | MQL | Result (mg/kg) |
|---|---|---|---|---|---|
|  | mercury | 0.005 | 0.005 | 0.034 | — |
|  | selenium | 0.156 | 0.003 | 0.022 | 0.09 |
|  | silver | 0.211 | 0.005 | 0.022 | 0.01 |
| F-6 | arsenic | 0.162 | 0.004 | 0.022 | 1.01 |
|  | barium | 0.206 | 0.005 | 0.021 | 2.11 |
|  | cadmium | 0.137 | 0.003 | 0.022 | 0.02 |
|  | chromium | 0.245 | 0.005 | 0.022 | 0.55 |
|  | lead | 0.126 | 0.003 | 0.022 | 1.69 |
|  | mercury | 0.005 | 0.026 | 0.178 | 2.29 |
|  | selenium | 0.156 | 0.003 | 0.022 | 0.08 |
|  | silver | 0.211 | 0.005 | 0.022 | 0.01 |
| F-8 | arsenic | 0.162 | 0.004 | 0.022 | 0.97 |
|  | barium | 0.206 | 0.005 | 0.021 | 1.95 |
|  | cadmium | 0.137 | 0.003 | 0.022 | 0.02 |
|  | chromium | 0.245 | 0.005 | 0.022 | 0.68 |
|  | lead | 0.126 | 0.003 | 0.022 | 1.69 |
|  | mercury | 0.005 | 0.026 | 0.172 | 3.34 |
|  | selenium | 0.156 | 0.003 | 0.022 | 0.09 |
|  | silver | 0.211 | 0.005 | 0.022 | 0.03 |
| F-10 | arsenic | 0.162 | 0.003 | 0.020 | 0.87 |
|  | barium | 0.206 | 0.004 | 0.020 | 2.89 |
|  | cadmium | 0.137 | 0.003 | 0.020 | 0.02 |
|  | chromium | 0.245 | 0.005 | 0.020 | 0.61 |
|  | lead | 0.126 | 0.003 | 0.020 | 1.47 |
|  | mercury | 0.005 | 0.025 | 0.164 | 2.17 |
|  | selenium | 0.156 | 0.003 | 0.020 | 0.08 |
|  | silver | 0.211 | 0.004 | 0.020 | 0.01 |

Chloride testing was performed on the stabilized and recycled examples F-4, F-6, F-8 and F-10, in which samples were retrieved after addition of the hydraulic binder and a period of solidification for 7 day. These tests were in accordance with Environmental Protection Agency, EPA Method 300A. Data presented in TABLE 9 show that the stabilized and recycled materials did not release potentially contaminating chloride that exceed standards set by the EPA Environmental Protection Agency.

TABLE 9

|  |  | MDL | SQL | MQL | Result |
|---|---|---|---|---|---|
| F-4 | solids (%) | 0.1 |  | 0.1 | 91.4 |
|  | chloride (mg/dL) | 0.05 | 0.05 | 0.1 | 68.0 |
| F-6 | solids (%) | 0.1 |  | 0.1 | 91.7 |
|  | chloride (mg/dL) | 0.05 | 0.05 | 0.1 | 89.0 |
| F-8 | solids (%) | 0.1 |  | 0.1 | 91.7 |
|  | chloride (mg/dL) | 0.05 | 0.05 | 0.1 | 110 |
| F-10 | solids (%) | — | — | — | — |
|  | chloride (mg/dL) | 0.05 | 0.05 | 0.1 | 68.5 |

Together, the data shows that the stabilized and recycled materials were safe and complied with federal and state standards for cementitious base materials. As such, the materials described herein can be used safely as a road base material or as a filling material, such as for a well, drill hole or borehole.

In another example, drill cuttings were obtained from a drilling site near Premont, Tex. The drill cuttings were generally large, irregularly shaped, sticky or muddy globs or large aggregated masses, as depicted in FIG. 2. They had not been further manipulated. To these drill cuttings, only a drying agent was introduced by a blending unit, which was a pug mill. The representative drying agent used was cement kiln dust, and was incorporated as 10% by weight of the total quantity of the drill cuttings. The output material after blending was air dried for seven days, considered to be dried to a friable state. The output was small, particulated or granular, said particulated or granular output was dry, as depicted in FIG. 3. Thereafter, Type I Portland cement was added in an amount that was between 6% and 8% by weight with addition of water, and small samples were compacted in accordance with AASHTO, T-99, generally to approximately 120 lb/cu-ft, as depicted in FIG. 8. Seven days after, a series of tests were performed, including 7-day leachate tests measuring hydrocarbons (TABLE 10, in accordance with Laboratory Procedures for Analysis of Exploration & Production Waste for parameters under Louisiana Administrative Code 43:XIX, subpart 1, and analyzed in accordance with Texas Commission on Environmental Quality, TEC TCEQ Method 1005), metals testing (TABLE 11, in accordance with Environmental Protection Agency, EPA Method 6010 or 7470 [for mercury] and EPA Method 1312), chloride testing (TABLE 12, in accordance with Environmental Protection Agency, EPA Method 300A), and pH testing (TABLE 12, in accordance with Environmental Protection Agency, EPA Method 9045). Data are provided in TABLES 10, 11 and 12.

TABLE 10

| hydrocarbon | MDL | SQL | MQL | Result (mg/L) |
|---|---|---|---|---|
| C6-C12 | 0.5 | 0.5 | 5.01 | <0.5 |
| C12-C28 | 0.5 | 0.5 | 5.01 | <0.5 |
| C28-C35 | 0.5 | 0.5 | 5.01 | <0.5 |

TABLE 11

| metal | MDL | SQL | MQL | Result (mg/L) |
|---|---|---|---|---|
| arsenic | 0.002 | 0.002 | 0.01 | <0.002 |
| barium | 0.007 | 0.007 | 0.01 | 0.128 |
| cadmium | 0.001 | 0.001 | 0.01 | 0.002 |
| chromium | 0.003 | 0.003 | 0.01 | 0.0116 |
| lead | 0.004 | 0.004 | 0.01 | <0.004 |
| mercury | 0.0002 | 0.0002 | 0.0005 | <0.0002 |
| selenium | 0.002 | 0.002 | 0.01 | <0.002 |
| silver | 0.001 | 0.001 | 0.05 | 0.019 |

TABLE 12

|  | MDL | SQL | MQL | Result |
|---|---|---|---|---|
| chloride | 0.05 | 1.00 | 3.20 | 143.0 (mg/L) |
| pH |  |  |  | 8.89 (pH unit) |

The remaining output material after blending (i.e., material forming the first combination) was laid on a surface of soil, the output material was generally laid to a depth of about six inches. One exemplary output had a surface of about 4700 square yards. This surface and depth is merely representative. For example, the surface may be of any dimension. The depth may be any desired depth, ranging at least from about a few inches to as many as several feet or more. Thereafter, the output was allowed to rest for about 7 days (though more or less days, in accordance with the description above, is acceptable). Only after resting, was the output rehydrated by first adding to the surface, both cement and water (e.g., added from tankers having suitable spreaders), followed by blending (e.g., with a tiller or rotor other suitable blending tool or machine) to combine the output with the cement and water in order to form the second combination to initiate the hydraulic reaction. When fully blended, the blended material was allowed to cure for 7 days (the period of time depending, in part, on the type of hydraulic binder). The top surface, after curing, may also be sealed or otherwise surface treated, coated and/or painted in any desired manner, as is understood in the art, such as to further minimize long-term wear and surface abrasion. Suitable surface treatments to the stabilized or recycled materials described herein, such as when formed as a road surface include a bituminous surface treatment, chipseal, thin membrane surface, and sealing coats, to give examples.

A core sample from the above-described stabilized or recycled road base material was drilled and measured for hydrocarbons (in accordance with Laboratory Procedures for Analysis of Exploration & Production Waste for parameters under Louisiana Administrative Code 43:XIX, subpart 1, and analyzed in accordance with Texas Commission on Environmental Quality, TCEQ Method 1005), for metals (in accordance with Environmental Protection Agency, EPA Method 6010 or 7470 [for mercury] and EPA Method 1312), for chloride (per Environmental Protection Agency, EPA Method 300A), and pH (in accordance with Environmental Protection Agency, EPA Method 9045). Data are provided in TABLES 13, 14 and 15.

TABLE 13

| hydrocarbon | MDL | SQL | MQL | Result (mg/L) |
|---|---|---|---|---|
| C6-C12 | 0.5 | 0.05 | 0.5 | <0.05 |
| C12-C28 | 0.5 | 0.05 | 0.5 | <0.05 |
| C28-C35 | 0.5 | 0.05 | 0.5 | <0.05 |

TABLE 14

| metal | MDL | SQL | MQL | Result (mg/L) |
|---|---|---|---|---|
| arsenic | 0.002 | 0.002 | 0.01 | <0.002 |
| barium | 0.007 | 0.007 | 0.01 | 0.197 |
| cadmium | 0.001 | 0.001 | 0.01 | <0.001 |
| chromium | 0.003 | 0.003 | 0.01 | 0.0178 |
| lead | 0.004 | 0.004 | 0.01 | <0.004 |
| mercury | 0.0002 | 0.0002 | 0.0005 | <0.0002 |
| selenium | 0.002 | 0.002 | 0.01 | <0.002 |
| silver | 0.001 | 0.001 | 0.05 | <0.001 |

TABLE 15

| | MDL | SQL | MQL | Result |
|---|---|---|---|---|
| pH | | | | 9.78 (pH unit) |

The TABLES 10, 11 and 12 illustrate output materials prior to solidification. TABLES 13, 14 and 15 illustrate materials after solidification. Together, the data show that these stabilized materials were safe and complied with federal and state standards for cementitious base materials suitable for use as a sub base or as a road material.

The stabilized or recycled materials described herein may be used safely as a road base material and/or as a filling material, such as for a well, drill hole or borehole. As either a road base material or a filling material, the stabilized or recycled materials described herein may be applied to a soil surface, a subsurface or other type of surface that may include a cementitious component, an asphalt component or other structural component. For example, a stabilized or recycled material described herein may be one layer, or provided as a number of layers, for a road comprising one or a number of components, including a base, a treated base (permeable or otherwise), a hot mix, and a cement top.

In TABLE 16, stabilized materials processed as described herein were obtained from seven drill wells in southern Texas at various locations in the Eagle Ford Shale region, each of which were drilled on similar dates (or within three months of each other). For TABLE 16, drill cuttings were processed in batches as the drill cuttings were removed from the well and after drilling mud was recaptured by a shaker system. In brief, drill cuttings from a single well were processed in batches, each batch included blending or comingling the drill cuttings taken off the shaker system with about 10 wt. % drying agent (range: 8 wt. % to 12 wt. %, using cement kiln dust) (forming the first combination) and stacking to rest on a surface or in a pit for at least three days or at least seven days or more after blending to provide a stabilized material in a second state; the average amount of days for resting varied with the number of days it took finish the well and collect all the drill cuttings from the well. The batches were generally stacked together in one pit. One well took up to a few days to retrieve all the drill cuttings. On average, and preferably at a minimum, the stabilized material had rested for about seven days or more, after which a sample (in a dried or friable state, second state) was removed and tested in accordance with the test methods identified in TABLE 16. All samples provided values below the standards, thereby considered stabilized and suitable for re-use or for recycling.

TABLE 16

| | | Result (mg/L) | Test Method |
|---|---|---|---|
| hydrocarbon | C6-C12 | <0.09 | TCEQ 1005 |
| | C12-C28 | <0.10 | TCEQ 1005 |
| | C28-C35 | <0.05 | TCEQ 1005 |
| | benzene | <0.004-0.185 | 1312/8021B |
| metal | arsenic | <0.002-01 | EPA 1312/6010 |
| | barium | 0.347-1.433 | EPA 1312/6010 |
| | cadmium | <0.001-0.005 | EPA 1312/6010 |
| | chromium | 0.0067-0.215 | EPA 1312/6010 |
| | lead | <0.004-0.01 | EPA 1312/6010 |
| | mercury | <0.0002-0.002 (ppm) | EPA 1312/6010 |
| | selenium | 0.004-0.01 | EPA 1312/6010 |
| | silver | <0.001-0.01 | EPA 1312/6010 |
| | zinc | <0.01 | SW 6010B |
| chloride | | 245-364 (mg/L) | EPA 300 |
| pH | | 8.37-11.5 (pH unit) | EPA 9045 |

Stabilized materials from six of the seven drill wells identified in TABLE 16 were further evaluated for compressive strength, in which a representative compressive strength value for a well sample is shown in TABLE 17. For TABLE 17, a sample was taken at any time after resting for about seven days. Once taken, each sample was tested 7 days after it was sent, in accordance with Tex 120E, in which each sample when compacted for testing had a generally uniform diameter of about 6 inches, an area of about 28.3 inches and a height that ranged from about 7.69 to 8 inches. Maximum loading of the samples was between 1275 and 3400 and pounds (lbs). The moisture content (moisture %) at time of molding was also measured, as provided in TABLE 17. These moisture content amounts represented a reduction in moisture of at least 20% based on the initial moisture content of the drill cuttings (before addition of the drying agent). The values in TABLE 17 confirm that the stabilized materials met the requirements for and were suitable as a sub base road material, having a compressive strength at least greater than 35 psi.

TABLE 17

|      | Height (inch) | Dry density (lb/ft³) | Strength (psi) | Moisture (%) |
|------|------|-------|-----|------|
| B-3  | 7.88 | 101.7 | 43  | 19.5 |
| B-4  | 7.75 | 105.2 | 57  | 17.9 |
| D-12 | 7.88 | 105.1 | 111 | 18.0 |
| D-13 | 8    | 103.1 | 114 | 18.0 |
| D-14 | 7.94 | 101.6 | 50  | 18.5 |
| D-15 | 7.69 | 104.1 | 44  | 19.2 |

In TABLE 18, further stabilized materials were evaluated by processing as described above for TABLE 16. These stabilized materials were obtained by using drill cuttings from eleven different drill wells in southern Texas at various locations in the Eagle Ford Shale region, each of which were drilled on similar dates (or within three months of each other). The values in TABLE 18 show the range of values that were obtained from the eleven drill wells and confirm that these stabilized materials when processed as described herein were safe, complying with federal and state standards as stabilized materials suitable for use as a sub base or as a road material or as a recycled material. Compressive strength data for these samples are provided in TABLE 19 for stabilized material obtained from ten of the drill sites, using testing as described with TABLE 17. Maximum load of the samples in TABLE 19 was up to about 3000 lbs. (between about 1075 and about 2475 lbs). The moisture content measured at time of molding represented a reduction in moisture of at least 20% based on the initial moisture content of the drill cuttings (before addition of the drying agent). Data from TABLE 19 also confirms that these stabilized materials met the requirements for and were suitable as a sub base road material, having a compressive strength of at least greater than 35 psi.

TABLE 18

|           |          | Result (mg/L)   | Test Method    |
|-----------|----------|-----------------|----------------|
| hydrocarbon | C6-C12  | <2              | TCEQ 1005      |
|           | C12-C28  | <2-14           | TCEQ 1005      |
|           | C28-C35  | <2              | TCEQ 1005      |
|           | benzene  | <0.004          | SW 8260B       |
| metal     | arsenic  | <0.01           | SW 6010B       |
|           | barium   | 0.319-0.96      | SW 6010B       |
|           | cadmium  | <0.005          | SW 6010B       |
|           | chromium | 0.0054-0.016    | SW 6010B       |
|           | lead     | <0.01           | SW 6010B       |
|           | mercury  | <0.002 (ppm)    | EPA 245.1/7470 |
|           | selenium | <0.02           | SW 6010B       |
|           | silver   | <0.01-0.02      | SW 6010B       |
|           | zinc     | <0.01           | SW 6010B       |
| chloride  |          | 97-503 (mg/L)   | EPA 300        |
| pH        |          | 10.2-11.6 (pH unit) | EPA 4500   |

TABLE 19

|       | Height (inch) | Dry density (lb/ft³) | Strength (psi) | Moisture (%) |
|-------|------|-------|----|------|
| AT-9  | 7.88 | 106.2 | 46 | 16.5 |
| AT-10 | 7.89 | 105.4 | 66 | 15.3 |
| G-1   | 8.38 | 99.4  | 84 | 20.4 |
| K-3   | 7.63 | 103.1 | 39 | 17.5 |
| K-4   | 7.50 | 104.5 | 42 | 17.5 |
| K-5   | 7.75 | 101.3 | 36 | 17.7 |
| K-6   | 7.25 | 101.8 | 41 | 17.1 |
| M-8   | 8.13 | 100.9 | 79 | 19.6 |

TABLE 19-continued

|     | Height (inch) | Dry density (lb/ft³) | Strength (psi) | Moisture (%) |
|-----|------|-------|----|------|
| R-1 | 8.13 | 99.4  | 62 | 20.8 |
| T-1 | 7.94 | 104.2 | 36 | 15.9 |

In further examples, drill cuttings were processed as described with TABLE 16 from twenty-five additional drill well sites in southern Texas at various locations in the Eagle Ford Shale region, each of which were drilled on similar dates (or within three months of each other). The values in TABLE 20 show the range of values that were obtained for the stabilized materials processed independently from the 25 additional drill wells and confirm that these stabilized materials when processed as described herein were safe, complying with federal and state standards as stabilized materials suitable for use as a sub base or as a road material or as a recycled material. For TABLE 21, drill cuttings were processed in a similar manner as described with TABLE 16, with compressive strength data provided in TABLE 21. Samples in TABLE 21 were tested in accordance with AASHTO T-99 and ASTM standards (D698) for a Proctor compaction test. The maximum load was up to about 1000 lb (amount ranged between about 510 and about 1030 lbs), in which each sample had a diameter of about 4 inches, an area of about 12.5 inches, and a height that ranged from about 4.5 inches to about 4.7 inches. TABLE 21 also provides the moisture content (moisture %) measured at the time of molding, which was a reduction in moisture of at least 20% based on the initial moisture content of the drill cuttings (before addition of the drying agent). Data from TABLE 21 confirms that these stabilized materials met the requirements for and were suitable as a sub base road material, having a compressive strength of 35 psi or greater.

TABLE 20

|           |          | Result (mg/L)     | Test Method    |
|-----------|----------|-------------------|----------------|
| hydrocarbon | C6-C12  | <2-2.5            | TCEQ 1005      |
|           | C12-C28  | <2-36             | TCEQ 1005      |
|           | C28-C35  | <2                | TCEQ 1005      |
| metal     | arsenic  | <0.01             | SW 6010B       |
|           | barium   | 0.352-1.18        | SW 6010B       |
|           | cadmium  | <0.005            | SW 6010B       |
|           | chromium | 0.005-0.015       | SW 6010B       |
|           | lead     | <0.01             | SW 6010B       |
|           | mercury  | <0.002 (ppm)      | EPA 245.1/7470 |
|           | selenium | <0.02             | SW 6010B       |
|           | silver   | <0.01             | SW 6010B       |
|           | zinc     | <0.01             | SW 6010B       |
| chloride  |          | 80-679 (mg/L)     | EPA 300        |
| pH        |          | 10.7-11.9 (pH unit) | EPA 4500     |

TABLE 21

|       | Height (inch) | Dry density (lb/ft³) | Strength (psi) | Moisture (%) |
|-------|------|-------|----|------|
| AL-11 | 4.53 | 95.2  | 62 | 16.9 |
| AL-12 | 4.59 | 104.6 | 41 | 11.1 |
| AL-13 | 4.65 | 109.8 | 56 | 9.5  |
| BR-20 | 4.59 | 109.4 | 46 | 9.9  |
| BR-21 | 4.68 | 114.1 | 55 | 9.5  |
| BL-5  | 4.58 | 107.7 | 39 | 8.4  |
| BL-6  | 4.59 | 102.7 | 48 | 10.3 |
| CS-17 | 4.60 | 110.1 | 72 | 11.0 |
| CS-33 | 4.68 | 106.9 | 79 | 10.1 |
| GL-1  | 4.69 | 117.1 | 67 | 8.0  |
| GL-2  | 4.72 | 115.6 | 45 | 8.2  |
| J-11  | 4.55 | 123.3 | 68 | 6.5  |

TABLE 21-continued

|  | Height (inch) | Dry density (lb/ft³) | Strength (psi) | Moisture (%) |
|---|---|---|---|---|
| J-12 | 4.67 | 109.7 | 63 | 9.8 |
| J-13 | 4.55 | 120.9 | 65 | 6.7 |
| KS-3 | 4.57 | 117.2 | 38 | 8.8 |
| ML-37 | 4.60 | 108.4 | 82 | 10.2 |
| N-11-1 | 4.53 | 116.8 | 65 | 7.3 |
| N-33-1 | 4.51 | 117.9 | 35 | 8.8 |
| N-33-2 | 4.62 | 109.4 | 54 | 11.4 |
| N-2-1 | 4.63 | 119.3 | 65 | 7.2 |
| N-2-2 | 4.60 | 117.2 | 51 | 7.4 |
| P-4 | 4.62 | 112.8 | 52 | 6.7 |
| U-7 | 4.63 | 108.4 | 41 | 10.7 |
| U-9 | 4.62 | 109.7 | 100 | 8.9 |
| W-1 | 4.53 | 118.0 | 38 | 9.0 |

In TABLE 22, stabilized materials were processed as described with TABLE 16 and were obtained from a further eight drill wells in southern Texas at various locations in the Eagle Ford Shale region, each of which were drilled on similar dates (or within two to three months of each other). The values in TABLE 22 show the range of values that were obtained from the eight drill wells and confirm that these stabilized materials when processed as described herein were safe, complying with federal and state standards as stabilized materials suitable for use as a sub base or as a road material or as a recycled material. Compressive strength testing data of stabilized materials prepared from seven of the well sites is provided in TABLE 23, in which samples were processed in accordance with AASHTO T-99 and ASTM standards (D698) for a Proctor compaction test, in which samples had a diameter of about 4 inches, an area of about 12.5 inches, and a height that was about 4.6 to 4.7 inches. Maximum load was up to 1000 lbs (between about 460 and about 950 lbs). TABLE 23 also provides moisture content (moisture %) measured at the time of molding, which was a reduction in moisture of at least 20% based on the initial moisture content of the drill cuttings (before addition of the drying agent). Data from TABLE 23 confirms that these stabilized materials met the requirements for and were suitable as a sub base road material, having a compressive strength of 35 psi or greater.

TABLE 22

|  |  | Result (mg/L) | Test Method |
|---|---|---|---|
| hydrocarbon | C6-C12 | <2 | TCEQ 1005 |
|  | C12-C28 | <2-2.4 | TCEQ 1005 |
|  | C28-C35 | <2 | TCEQ 1005 |
| metal | arsenic | <0.01 | SW 6010B |
|  | barium | 0.414-0.988 | SW 6010B |
|  | cadmium | <0.005 | SW 6010B |
|  | chromium | 0.005-0.014 | SW 6010B |
|  | lead | <0.01 | SW 6010B |
|  | mercury | <0.002 (ppm) | EPA 245.1/7470 |
|  | selenium | <0.02 | SW 6010B |
|  | silver | <0.01 | SW 6010B |
|  | zinc | <0.01 | SW 6010B |
| chloride |  | 74-526 (mg/L) | EPA 300 |
| pH |  | 11.0-12.0 (pH unit) | EPA 4500 |

TABLE 23

|  | Height (inch) | Dry density (lb/ft³) | Strength (psi) | Moisture (%) |
|---|---|---|---|---|
| CS-64 | 4.65 | 115.6 | 62 | 5.7 |
| N-34-2b | 4.6 | 114.8 | 69 | 7.6 |
| N-34-2 | 4.68 | 114.9 | 48 | 10.1 |
| N-37-1 | 4.65 | 112.6 | 35 | 8.6 |
| N-42-4 | 4.63 | 116.3 | 60 | 7.6 |
| N-53-1 | 4.58 | 118.4 | 72 | 7.1 |
| P-5 | 4.65 | 116.9 | 39 | 7.8 |

Any of the stabilized materials from the examples may be used alone (once stabilized as described above) or in combination with binder(s) described herein and/or surface acting agent(s) described herein. Used alone, the stabilized materials may be dumped, spread out on a surface or on the ground (either soil or other sub surface) to a desired thickness and rolled to apply a density to the stabilized material. A plurality of layers may be laid down, one above the other. In some embodiments, each layer (when more than one) may have a thickness that is less than ten inches or less than eight inches. Each layer (when more than one layer is applied) may generally be at least 2 inches, or 3 inches, and often is at least 4 inches. There is no limit to the number of layers comprised of the stabilized materials described herein that may be applied to a surface. Said one or more layers may be further treated, pigmented, or modified, e.g., for surface water repellence, etc.

In another example of further processing stabilized materials, the stabilized materials, once stabilized as described herein (caused to achieve the second state) are spread out to a desired thickness. The spreading may be on a prepared road surface, dirt, or other type of surface to which a stabilized material may be laid out on. In one example, when laying out as a road material, the layer thickness after spreading may be between about 4 inches and about 8 inches. The layer when spread is rolled. This may then be used a road base. This will have strength of at least 35 psi. Alternatively, the rolled layer may be wetted and/or plowed, with or without cutting ruts therein. When wetting, a surface acting agent may be included. This may then be blended using an appropriate blending unit to blend the surface acting agent with at least a top surface of the layer, which may include a few inches to half the depth or even to the full depth of the layer. This layer of stabilized material may also serve as a suitable surface for driving on, including large trucks and/or construction equipment. The process may be repeated in order to achieve a plurality of layers. To solidify (the one or plurality of layers), before the previously described blending or after said blending, a binder (e.g., a cementitious binder, such as a cement or Type I Portland cement, with appropriate additives suitable for a road) may be applied thereon or spread out onto the wetted surface. With cement, a sufficient amount may be included for a final concentration of cement to be between about 4 wt. % and about 10 wt. %. In some embodiments, the final amount of cement may be about 6 wt. %. Upon spreading the binder or cement, a mixer is directed over the surface, mixing the surface as well as mixing to a desired depth below the surface. The depth may, in some embodiments, be up to about 6 inches, or may be more than six inches, or less than six inches. After mixing, water or an aqueous solution (one that is suitable for use and for a next mixing with the binder, when already applied thereon) is sprayed on the surface of the mixture. In some instances this water aqueous solution, rather than the prior wetting, may include the surface acting agent. The surface acting agent when included (in either wetting step) is typically included to a final concentration of up to about 1%, or may be up to about 0.5% or may be up to about 0.1%, or in any amount therein (generally not more than about 0.5 wt. % or not more than about 1 wt. %). After addition of the water or aqueous solution (with or without the surface action agent), there is further mixing, the mixing here is often either to the full depth of the layer or near the full depth of the layer. Following mixing, the layer may optionally be compacted with a compactor and/or graded. In some embodiments, there may optionally be another mixing, in which mixing is generally not to the full depth, and may be only about or less than about half the depth of the layer. A further compaction may or may not occur thereafter, at which time the road may already be ready for use or may be allowed to set for several days (up to about 10 days) before allowing heavy traffic. Said preparation as described is a road material suitable for heaving construction equipment and heavy traffic thereon. Said preparation may include additional steps or fewer steps as desired in order to achieve a solidified and stabilized material that may serve as a road material or as a base material for a road. Other uses are also acceptable with the stabilized materials described herein.

When the stabilized or recycled materials described herein include a cementitious binder, the stabilized and solidified materials may be used in addition to or as replacement to a cement treated base (permeable or other treated base). When the stabilized or recycled materials described herein include an asphalt containing binder, such stabilized and solidified materials may be used in addition to or as replacement to an asphalt treated base (permeable or other treated base). When the stabilized or recycled materials described herein include a binder suitable for a lean concrete base or sub base, such stabilized and solidified materials when finally formed may be used in addition to or as replacement to a lean concrete base or sub base. When the stabilized or recycled materials described herein include a binder suitable for a lime treated base or sub base, such stabilized and recycled materials when fully formed may be used in addition to or as replacement to a lime treated base or sub base.

Although representative processes and articles have been described in detail herein, those skilled in the art will recognize that various substitutions and modifications may be made without departing from the scope and spirit of what is described and defined by the appended claims.

What is claimed is:

1. A method of preparing a stabilized material that is substantially friable, the method comprising:
   combining a drying agent and a quantity of drill cuttings to form a first combination that does not include a pozzolan that would cause the stabilized material to be substantially non-friable, the quantity of drill cuttings having a moisture content between about 1% and about 45% by weight prior to combining, the drying agent in the first combination being in an amount greater than about 1% and less than a first upper weight percentage by weight of the drill cuttings, the drying agent causing the first combination to achieve a first state such that the liquid content of the first combination is less than the liquid content of the drill cuttings prior to combining;
   causing the first combination to achieve a second state, the second state having liquid content that is at least the first upper weight percentage by weight less than the liquid content of the drill cuttings prior to combining;
   such that the causing the first combination to achieve the second state causes formation of the stabilized material that is substantially friable,
   wherein the drying agent has an alkaline pH,
   wherein causing the first combination to achieve the second state includes waiting following the combining of the drying agent and the quantity of drill cuttings to form the first combination that does not include the pozzolan that would cause the stabilized material to be substantially non-friable, and
   wherein the first combination in the second state is the stabilized material that is substantially friable.

2. The method of claim 1, wherein the drying agent is a byproduct of a calcination reaction.

3. The method of claim 1, wherein the drying agent is in an amount between about 5% and to about 12% by weight based on the total weight of the first combination.

4. The method of claim 1, wherein the liquid content of the quantity of drill cuttings prior to combining is between about 5% and about 15% by weight.

5. The method of claim 1, wherein the drying agent is in an amount from about 5% and about 10% by weight of the quantity of the drill cuttings.

6. The method of claim 1, wherein the waiting is for at least seven days.

7. The method of claim 1, wherein the drying agent includes calcium carbonate.

8. The method of claim 1, wherein the drying agent includes less than 10% by weight crystalline silica.

9. The method of claim 1, wherein the drying agent is a non-pozzolan.

10. The method of claim 1, wherein the first upper weight percentage is 20% by weight.

11. A method of preparing a stabilized material, the method comprising:
    combining ingredients consisting of a drying agent and a quantity of drill cuttings to form a first combination, the quantity of drill cuttings having a moisture content between about 1% and about 45% by weight prior to combining, the drying agent in the first combination being in a first amount by weight of the drill cuttings, the drying agent causing the first combination to achieve a first state substantially without pozzolanic reaction such that the moisture content of the first combination is less than the moisture content of the drill cuttings prior to combining;
    causing the first combination to achieve a friable second state, the friable second state having moisture content that is a second amount by weight less than the moisture content of the drill cuttings prior to combining, the second amount having a greater absolute magnitude than the first amount;
    such that the causing the first combination to achieve the second state causes formation of the stabilized material that is friable,
    wherein causing the first combination to achieve the second state includes waiting.

12. The method according to claim 11, wherein the waiting is for at least seven days.

13. The method according to claim 11, wherein the first amount by weight of the drill cuttings comprises between about 1% and to about 20% by weight of the drill cuttings.

14. The method according to claim 11, wherein the second amount is at least about 20% by weight.

15. The method according to claim 11,
    wherein the drying agent has an alkaline pH,
    wherein the drying agent includes calcium carbonate,
    wherein the drying agent includes less than 10% by weight crystalline silica.

16. The method according to claim 11, wherein the drying agent is a non-pozzolan.

17. A method of preparing a friable stabilized material, the method comprising:
  combining a drying agent and a quantity of drill cuttings to form a first combination, the quantity of drill cuttings having a moisture content between about 1% and about 45% by weight prior to combining, the drying agent in the first combination being in an amount between about 1% and to about 20% by weight of the drill cuttings, the drying agent causing the first combination to achieve a first state such that the moisture content of the first combination is less than the moisture content of the drill cuttings prior to combining;
  causing the first combination to achieve a friable second state, the friable second state having moisture content that is at least about 20% by weight less than the moisture content of the drill cuttings prior to combining;
  such that first combination that has achieved the friable second state is the stabilized material that is friable,
  wherein the drying agent has an alkaline pH,
  wherein causing the first combination to achieve the second state includes waiting; and
  causing the friable stabilized material to be spread out on a ground surface.

18. The method of claim 17, wherein the drying agent includes calcium carbonate and wherein the drying agent includes less than 10% by weight crystalline silica.

19. The method of claim 17, wherein the waiting is for at least 36 hours.

20. A method of preparing a stabilized material that is substantially friable, the method comprising:
  combining (i) a drying agent that does not include a pozzolan that would cause the stabilized material to be substantially non-friable and (ii) a quantity of drill cuttings that does not include the pozzolan that would cause the stabilized material to be substantially non-friable, to form a first combination that does not include the pozzolan that would cause the stabilized material to be substantially non-friable,
  the quantity of drill cuttings having a liquid content between about 1% and about 45% by at least one of weight and volume prior to combining,
  the drying agent in the first combination being in an amount greater than about 1% and less than a first upper percentage by at least one of weight and volume of the drill cuttings, the drying agent causing the first combination to achieve a first state such that the liquid content of the first combination is less than the liquid content of the drill cuttings prior to combining;
causing the first combination to achieve a second state, the second state having liquid content that is at least the first upper percentage by at least one of weight and volume less than the liquid content of the drill cuttings prior to combining;
  such that the causing the first combination to achieve the second state causes formation of the stabilized material that is substantially friable,
  wherein the drying agent has an alkaline pH,
  wherein the drying agent includes calcium carbonate,
  wherein the drying agent includes less than 10% by weight crystalline silica,
  wherein causing the first combination to achieve the second state includes waiting following the combining of (i) the drying agent that does not include the pozzolan that would cause the stabilized material to be substantially non-friable and (ii) the quantity of drill cuttings that does not include the pozzolan that would cause the stabilized material to be substantially non-friable to form the first combination that does not include the pozzolan that would cause the stabilized material to be substantially non-friable, and
  wherein the first combination in the second state is the stabilized material that is substantially friable.

* * * * *